(12) United States Patent
Kim et al.

(10) Patent No.: US 12,093,485 B2
(45) Date of Patent: Sep. 17, 2024

(54) TOUCH DISPLAY DEVICE, TOUCH DRIVING CIRCUIT, AND TOUCH DRIVING METHOD

(71) Applicant: LG Display Co., Ltd., Seoul (KR)

(72) Inventors: SunYeop Kim, Seoul (KR); SungChul Kim, Paju-si (KR); HoonBae Kim, Seoul (KR); Seongkyu Kang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 79 days.

(21) Appl. No.: 17/972,467

(22) Filed: Oct. 24, 2022

(65) Prior Publication Data
US 2023/0229259 A1 Jul. 20, 2023

(30) Foreign Application Priority Data
Dec. 24, 2021 (KR) .................. 10-2021-0187007

(51) Int. Cl.
*G06F 3/041* (2006.01)
*G06F 3/044* (2006.01)

(52) U.S. Cl.
CPC ........ *G06F 3/0418* (2013.01); *G06F 3/04164* (2019.05); *G06F 3/0446* (2019.05)

(58) Field of Classification Search
CPC ... G06F 3/0418; G06F 3/0446; G06F 3/04164
USPC .......................................................... 345/173
See application file for complete search history.

(56) References Cited

U.S. PATENT DOCUMENTS 9,223,425 B1* 12/2015 Kim .................... G06F 3/04166
2009/0314621 A1* 12/2009 Hotelling ............. G06F 3/0443
200/600

* cited by examiner

*Primary Examiner* — Mark Edwards
(74) *Attorney, Agent, or Firm* — Fenwick & West LLP

(57) ABSTRACT

Embodiments of the disclosure relate to a touch display device, a touch driving circuit, and a touch driving method. Specifically, a touch display device comprises a display panel including a plurality of touch electrodes, a gate driving circuit configured to supply a plurality of scan signals to the display panel through a plurality of gate lines, a touch driving circuit configured to detect touch according to a change in capacitance of the plurality of touch electrodes, and a power management circuit configured to supply a different level of compensation voltages to the plurality of touch electrodes in each of an overlap distortion period in a display driving period, a transition distortion period of the display driving period, and a touch driving period.

17 Claims, 21 Drawing Sheets

TOUCH DISPLAY DEVICE, TOUCH DRIVING CIRCUIT, AND TOUCH DRIVING METHOD

CROSS-REFERENCE TO RELATED APPLICATION

This application claims priority from Republic of Korea Patent Application No. 10-2021-0187007, filed on Dec. 24, 2021, which is hereby incorporated by reference in its entirety.

BACKGROUND

Field

Embodiments of the disclosure relate to a touch display device, a touch driving circuit, and a touch driving method.

Description of Related Art

With the development of multimedia, the importance of flat panel display devices is increasing. In response, flat panel display devices, such as liquid crystal displays, plasma display panels, and organic light emitting displays, have been commercialized.

Also in wide use are touch display devices having a display device and a touch panel stacked on the display device to detect the touch point which undergoes a variation in resistance or capacitance due to a contact of the hand or a stylus pen and to output information corresponding to the touch point or perform computation.

Such a touch display device is a user interface, and its applications are expanding to small portable terminal devices, office devices, mobile devices, and the like.

However, by having a separate touch panel stacked thereon, the touch display device is thickened and hard to slim down, and suffers from a reduction in light transmission efficiency and an increase in manufacturing costs. To address such issues, there have been recently proposed advanced in-cell touch (AIT) display devices having built-in touch electrodes in the pixel areas of the display panel.

Meanwhile, such a touch display device is subjected to an increase in the load of the built-in touch electrode in the display panel due to an increase in size and resolution. Thus, the direct current (DC) voltage supplied to the touch electrode is distorted, causing an error in the image displayed on the display panel.

SUMMARY

A touch display device, touch driving circuit, and touch driving method capable of reducing distortion of DC voltage due to the load of the touch electrode is disclosed.

Embodiments of the disclosure may provide a touch display device, touch driving circuit, and touch driving method, capable of effectively reducing distortion of DC voltage by classifying DC voltage distortions according to characteristics and applying a compensation voltage corresponding to the characteristic of the DC voltage distortion.

Embodiments of the disclosure may provide a touch display device, touch driving circuit, and touch driving method, capable of effectively reducing distortion of DC voltage by classifying DC voltage distortions according to periods when display driving operation and touch driving operation are performed alternately and applying a compensation voltage corresponding to the period when a DC voltage distortion occurs.

Embodiments of the disclosure may provide a touch display device, touch driving circuit, and touch driving method, capable of effectively reducing distortion of DC voltage by classifying DC voltage distortions according to the structure of the touch electrode and applying a compensation voltage corresponding to the area where a DC voltage distortion occurs.

Embodiments of the disclosure may provide a touch display device comprising a display panel including a plurality of touch electrodes, a gate driving circuit configured to supply a plurality of scan signals to the display panel through a plurality of gate lines, a touch driving circuit configured to detect touch sensing operation according to a change in capacitance of the plurality of touch electrodes, and a power management circuit configured to supply different level of compensation voltages to the plurality of touch electrodes in each of an overlap distortion period in a display driving period and a transition distortion period of the display driving period and a touch driving period.

Embodiments of the disclosure provide a touch driving circuit comprising a touch sensing circuit configured to supply a touch driving signal through a plurality of touch lines to a plurality of touch electrodes included in a display panel and receiving a touch sensing signal from the plurality of touch electrodes, a touch controller configured to detect whether there is a touch and calculate touch coordinates according to the touch sensing signal, and a compensation voltage generation circuit configured to supply different level of compensation voltages to the plurality of touch electrodes in each of an overlap distortion period in a display driving period and a transition distortion period of the display driving period and a touch driving period.

Embodiments of the disclosure may provide a touch driving method of a touch display device including a gate driving circuit supplying a scan signal to a display panel including a plurality of touch electrodes and a touch driving circuit supplying a touch driving signal to the display panel and sensing a touch based on a touch sensing signal received in response to the touch driving signal, comprising determining an overlap distortion of a DC voltage occurring in an overlap distortion period, determining a transition distortion of the DC voltage occurring in a transition distortion period, dividing the transition distortion period into a first transition distortion period and a second transition distortion period, generating an overlap compensation voltage applied in the overlap distortion period, a first transition compensation voltage applied in the first transition distortion period, and a second transition compensation voltage applied in the second transition distortion period, and applying the compensation voltage in the overlap distortion period and the transition distortion period.

Effects of the Disclosure

According to embodiments of the disclosure, there may be provided a touch display device, touch driving circuit, and touch driving method capable of reducing distortion of DC voltage due to the load of the touch electrode.

According to embodiments of the disclosure, there may be provided a touch display device, touch driving circuit, and touch driving method, capable of effectively reducing distortion of DC voltage by classifying DC voltage distortions according to characteristics and applying a compensation voltage corresponding to the characteristic of the DC voltage distortion.

According to embodiments of the disclosure, there may be provided a touch display device, touch driving circuit, and touch driving method, capable of effectively reducing distortion of DC voltage by classifying DC voltage distortions according to periods when display driving operation and touch driving operation are performed alternately and applying a compensation voltage corresponding to the period when a DC voltage distortion occurs.

According to embodiments of the disclosure, there may be provided a touch display device, touch driving circuit, and touch driving method, capable of effectively reducing distortion of DC voltage by classifying DC voltage distortions according to the structure of the touch electrode and applying a compensation voltage corresponding to the area where a DC voltage distortion occurs.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
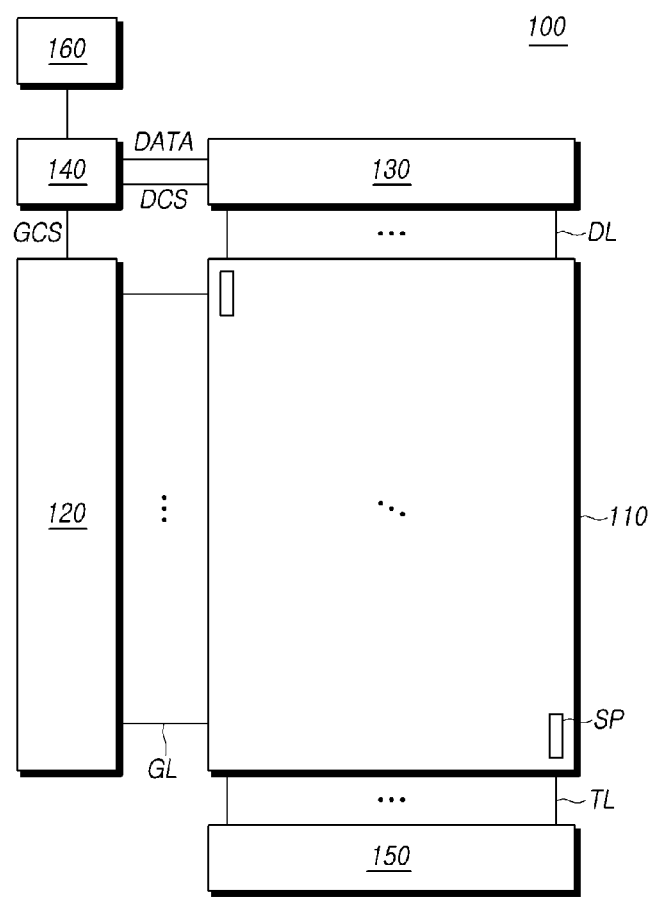
FIG. 1 is a view schematically illustrating a touch display device according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure will be described in detail with reference to the accompanying drawings.

FIG. 1 is a view schematically illustrating a configuration of a touch display device according to an embodiment.

Referring to FIG. 1, a touch display device 100 according to embodiments of the disclosure may include a display panel 110, a gate driving circuit 120, a data driving circuit 130, a timing controller 140, and the display panel 110. The touch display device 100 may also include a touch driving circuit 150 and a power management circuit 160 for sensing a touch.

The display panel 110 may include a plurality of gate lines GL, a plurality of data lines DL, and multiple subpixels SP at the crossings of the gate lines GL and the data lines DL.

Multiple touch electrodes may be arranged or embedded in the display panel 110, and multiple touch lines TL for electrically connecting the touch electrodes with the touch driving circuit 150 may be arranged on the display panel 110.

A configuration for display driving in the display device 100 is described first. The gate driving circuit 120 controls the driving timing of the subpixels SP arranged in the display panel 110. The data driving circuit 130 supplies a data voltage corresponding to image data to the subpixel SP. As a result, the subpixel SP emits light with a brightness corresponding to the gray level of the image data to display the image.

Specifically, the gate driving circuit 120 may be controlled by the timing controller 140 to sequentially output scan signals to the plurality of gate lines GL disposed in the display panel 110, controlling the driving timing of the subpixels SP.

The gate driving circuit 120 may include one or more gate driving integrated circuits GDIC. Depending on driving schemes, the gate driving circuit 120 may be positioned on only one side, or each of two opposite sides, of the display panel 110. The gate driving circuit 120 may be implemented in a gate-in-panel (GIP) form which is directly embedded in the bezel area of the display panel 110.

The data driving circuit 130 receives digital image data DATA from the timing controller 140 and converts the image data DATA into an analog data voltage. The data driving circuit 130 outputs a data voltage to each data line DL according to the timing of applying a scan signal via the gate line GL, allowing each subpixel SP to represent a brightness according to the data voltage.

The data driving circuit 130 may include one or more source driving integrated circuits SDIC.

The timing controller 140 supplies various control signals to the gate driving circuit 120 and the data driving circuit 130 and controls the operation of the gate driving circuit 120 and the data driving circuit 130.

The timing controller 140 enables the gate driving circuit 120 to output scan signals according to the timing of implementing each frame, converts image data received from outside the display device 100 (e.g., a host system) to meet the data signal format used by the data driving circuit 130, and outputs the resultant image data DATA to the data driving circuit 130.

The timing controller 140 receives, from the outside (e.g., a host system), various timing signals including a vertical synchronization signal, a horizontal synchronization signal, an input data enable signal, and a clock signal, along with the image data DATA.

The timing controller 140 may generate a data control signal DCS and a gate control signal GCS according to various timing signals received from the outside and may output them to the data driving circuit 130 and the gate driving circuit 120, respectively.

As an example, to control the gate driving circuit 120, the timing controller 140 outputs various gate control signals GCS including a gate start pulse, a gate shift clock, and a gate output enable signal.

The gate start pulse controls the operation start timing of one or more gate driving integrated circuits constituting the gate driving circuit 120. The gate shift clock is a clock signal commonly input to one or more gate driving integrated circuits and controls the shift timing of the scan signals. The gate output enable signal designates timing information about one or more gate driving integrated circuits.

To control the data driving circuit 130, the timing controller 140 outputs various data control signals DCS including for example, a source start pulse, a source sampling clock, and a source output enable signal.

The source start pulse controls the data sampling start timing of one or more source driving integrated circuits constituting the data driving circuit 130. The source sampling clock is a clock signal for controlling the sampling timing of data in each source driving integrated circuit. The source output enable signal controls the output timing of the data driving circuit 130.

The touch display device 100 may include a touch driving circuit 150 that performs touch sensing and stylus sensing according to the signal received through the display panel 110 by driving the display panel 110 having a built-in touchscreen panel.

The touch driving circuit 150 may include a first circuit for applying the touch driving signal to the touch electrodes constituting the display panel 110 and receiving the touch sensing signal through the sensing line SL and a second circuit for detecting whether there are passive touch sensing (finger touch sensing) and active touch sensing using the sensing signal received through the display panel 110.

The first circuit may be referred to as a touch sensing circuit (read out integrated circuit (ROIC)), and the second circuit may be referred to as a touch controller.

The touch driving circuit 150 may sense the presence and/or position of a touch based on a deviation in capacitance between the touch electrodes formed on the display panel 110. In other words, a deviation in capacitance occurs between a position touched by a passive stylus including the user's finger or an active stylus and a non-touch position. The touch driving circuit 150 senses the presence and position of a touch in such a manner as to detect the capacitance deviation. The touch driving circuit 150 generates a touch sensing output signal about the presence and/or position of a touch, and transfers it to an external micro control unit (not shown).

The micro control unit controls the touch driving circuit 150. The micro control unit may receive a touch synchronization signal from a timing controller (not shown) and generate a touch driving signal for controlling the touch driving circuit 150 based on the received touch synchronization signal. The micro control unit transmits and receives a touch sensing signal and a touch driving signal based on an interface defined between it and the touch driving circuit 150.

The micro control unit may be integrated with the touch controller TCR or the timing controller into a single integrated circuit. When the micro control unit and the touch controller are integrated into a single integrated circuit, the touch sensing circuit ROIC may be referred to as a touch driving circuit.

The touch display device 100 may further include a power management circuit 160 that supplies various voltages or currents to for example, the display panel 110, the gate driving circuit 120, the data driving circuit 150, and the touch driving circuit 150 or controls various voltages or currents to be supplied.

The power management circuit 160 adjusts the direct current (DC) input voltage supplied from the host system, and generates power required to drive the display panel 110, the gate driving circuit 120, the data driving circuit 130, and the touch driving circuit 150.

The data driving circuit 130 applying the data voltage to the data line DL is also referred to as a source driving circuit or a source driving integrated circuit SDIC, and the touch driving circuit 150 and the data driving circuit 130 may be together implemented as an integrated driving circuit SRIC.

In this case, the integrated driving circuit SRIC may be of a chip on film (COF) type mounted on a film and may be embedded in the display panel 110 or mounted on a printed circuit board (PCB).

The film on which the integrated driving circuit SRIC is mounted may be coupled to each of the bonding unit of the display panel 110 and the bonding unit of the printed circuit board (PCB).

A touch controller may be mounted on the printed circuit board (PCB).

The touch driving circuit 150 and the data driving circuit 130 may be integrated in separate driving chips. The touch driving circuit 150 may be electrically connected to a plurality of touch electrodes constituting the display panel 110 through a plurality of sensing lines.

In this case, the touch driving circuit 150 may perform touch sensing in a time-divided touch driving period separately from the display driving period. The touch driving period for performing touch sensing may proceed simultaneously with the display driving period.

When an encapsulation layer is formed on the display panel 110, and the touch electrode is disposed thereon, the capacitance for driving the touch electrode may increase. Thus, it may be necessary to increase the level of the touch driving signal for driving the touch electrode. To that end, a level shifter (not shown) may be added between the touch driving circuit 150 and the display panel 110 to control the level of the touch driving signal.

Each subpixel SP may be defined by the crossing of the gate line GL and the data line DL, and liquid crystals or a light emitting element may be disposed in each subpixel SP depending on the type of the touch display device 100.

As an example, when the display device 100 is a liquid crystal display device, the display device 100 may include a light source device, such as a backlight unit, to emit light to the display panel 110. Liquid crystals are disposed in the subpixel SP of the display panel 110. The alignment of liquid crystals may be adjusted by an electric field created as data voltage is applied to each subpixel SP, thereby representing a brightness according to the data voltage and displaying an image.

In the case of a liquid crystal display device, the display panel 110 may include a liquid crystal layer formed between two substrates and may be operated in any known mode, such as a twisted nematic (TN) mode, a vertical alignment (VA) mode, an in-plane switching (IPS) mode, or a fringe field switching (FFS) mode. In the case of an organic light emitting display device, the display panel 110 may be implemented in a top emission scheme, a bottom emission scheme, or a dual-emission scheme.

Meanwhile, the display device 100 according to embodiments of the disclosure may detect the user's touch on the display panel 110 using the touch driving circuit 150 and the touch electrodes included in the display panel 110.

Figure 2:
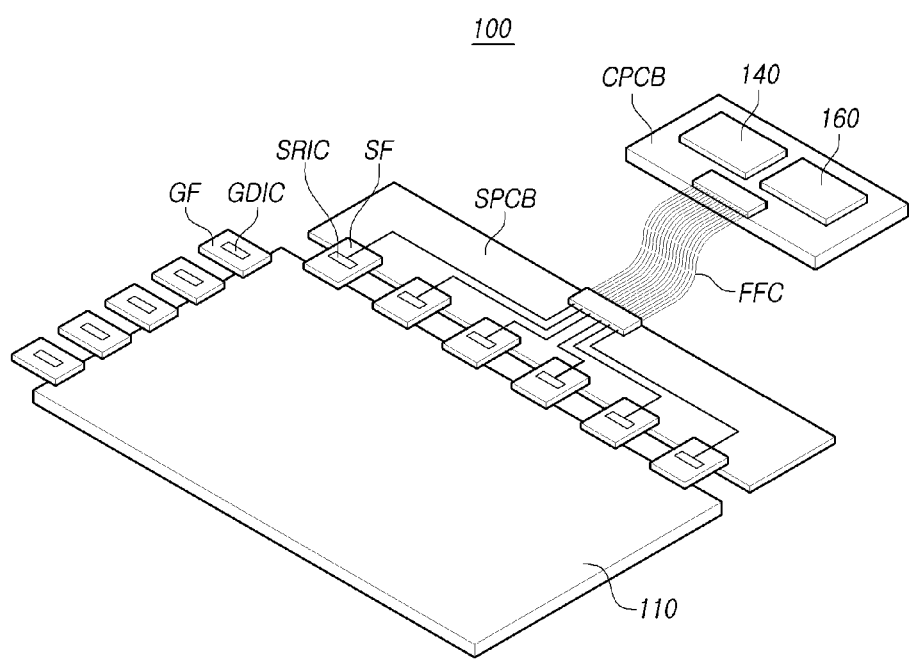
FIG. 2 is a view illustrating an example of a system of a touch display device according to embodiments of the disclosure.

FIG. 2 is a view illustrating an example of a system of a touch display device according to embodiments of the disclosure.

Referring to FIG. 2, in the touch display device 100 according to embodiments of the disclosure, the integrated circuit SRIC in which the data driving circuit 130 and the touch driving circuit 150 are integrated with each other and the gate driving integrated circuit GDIC are implemented in the chip-on-film (COF) type among various types (e.g., TAB, COG, or COF).

One or more gate driving integrated circuits GDIC each may be mounted on a gate film GF, and one side of the gate film GF may be electrically connected with the display panel 110. Lines for electrically connecting the gate driving integrated circuit GDIC and the display panel 110 may be disposed on the gate film GF.

Likewise, one or more integrated driving circuits SRIC each may be mounted on the source film SF, and one side of the source film SF may be electrically connected with the display panel 110. Lines for electrically connecting the integrated driving circuit SRIC and the display panel 110 may be disposed on the source film SF.

The display device 100 may include at least one source printed circuit board SPCB for circuit connection between a plurality of integrated driving circuits SRIC and other devices and a control printed circuit board CPCB for mounting control components and various electric devices.

The other side of the source film SF where the integrated driving circuit SRIC is mounted may be connected to at least one source printed circuit board SPCB. In other words, one side of the source film SF where the integrated driving circuit SRIC is mounted may be electrically connected with the display panel 110, and the other side thereof may be electrically connected with the source printed circuit board SPCB.

The timing controller 140 and the power management circuit (power management IC) 160 may be mounted on the control printed circuit board CPCB. The timing controller 140 may control the operation of the data driving circuit 130, the gate driving circuit 120, and the touch driving circuit 150. The power management circuit 160 may supply driving voltage or current to the display panel 110, the data driving circuit 130, the gate driving circuit 120, and the touch driving circuit 150 and control the supplied voltage or current.

At least one source printed circuit board SPCB and control printed circuit board CPCB may be circuit-connected through at least one connection member. The connection member may include, e.g., a flexible printed circuit FPC or a flexible flat cable FFC. In this case, the connection member connecting the at least one source printed circuit board SPCB and control printed circuit board CPCB may be varied depending on the size and type of the touch display device 100. The at least one source printed circuit board SPCB and control printed circuit board CPCB may be integrated into a single printed circuit board.

In the so-configured touch display device 100, the power management circuit 160 transfers a driving voltage necessary for display driving or characteristic value sensing to the source printed circuit board SPCB through the flexible printed circuit FPC or flexible flat cable FFC. The driving voltage transferred to the source printed circuit board SPCB is supplied to emit light or sense a specific subpixel SP in the display panel 110 through the source driving integrated circuit SDIC.

Each of the subpixels SP arranged in the display panel 110 in the display device 100 may include an organic light emitting diode, which is an example of a light emitting element, and a circuit element, e.g., a driving transistor, for driving the organic light emitting diode.

The type and number of circuit elements constituting each subpixel SP may be varied depending on functions to be provided and design schemes.

Figure 3:
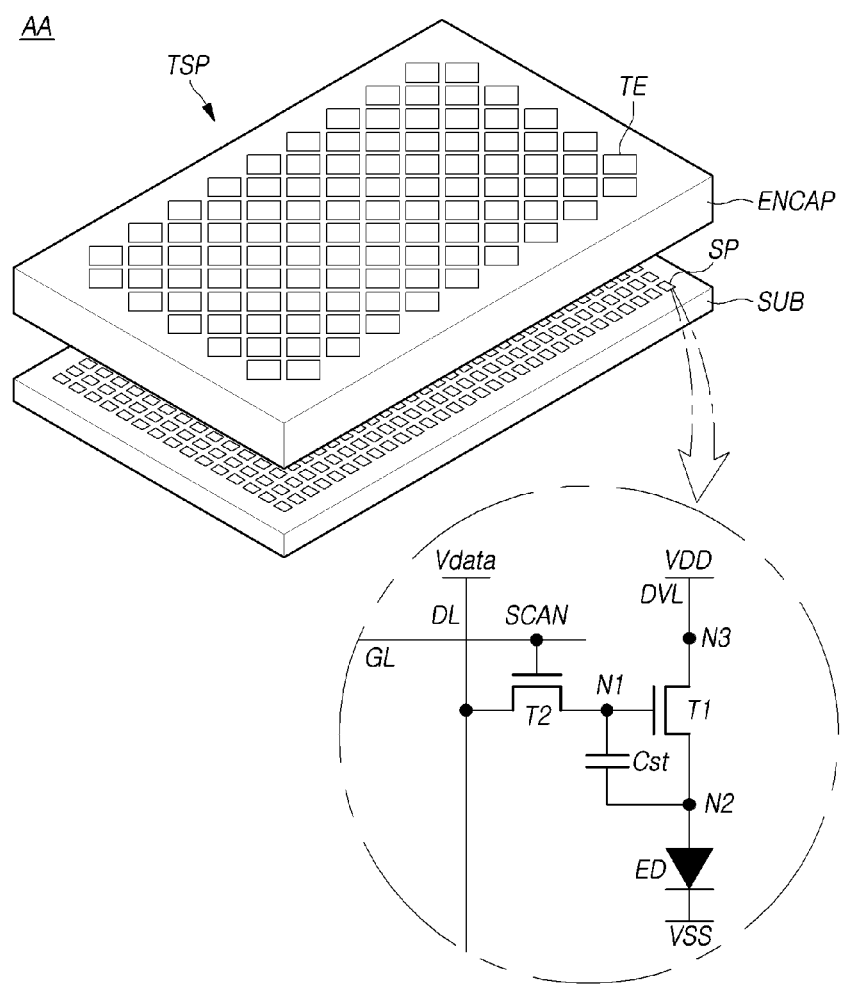
FIG. 3 is a view illustrating an example of a structure in which a touchscreen panel is embedded in a display panel in a touch display device according to embodiments of the disclosure.

FIG. 3 is a view illustrating an example of a structure in which a touchscreen panel is embedded in a display panel in a touch display device according to embodiments of the disclosure.

Referring to FIG. 3, in the touch display device 100 according to embodiments of the disclosure, a plurality of subpixels SP are arranged on the substrate SUB in the display area AA of the display panel 110.

Each subpixel SP may include a light emitting element ED, a first transistor T1 for driving the light emitting element ED, a second transistor T2 for transferring a data voltage Vdata to a first node N1 of the first transistor T1, and a storage capacitor Cst for maintaining a constant voltage during one frame.

The first transistor T1 may include the first node N1 to which the data voltage Vdata may be applied through the second transistor T2, a second node N2 electrically connected with the light emitting element ED, and a third node N3 to which a driving voltage VDD is applied from a driving voltage line DVL. The first node N1 may be a gate node, the second node N2 may be a source node or a drain node, and the third node N3 may be the drain node or the source node. The first transistor T1 is referred to as a driving transistor for driving the light emitting element ED.

The light emitting element ED may include a first electrode (e.g., an anode electrode), a light emitting layer, and a second electrode (e.g., a cathode electrode). The first electrode may be electrically connected with the second node N2 of the first transistor T1, and a base voltage VSS may be applied to the second electrode.

The light emitting layer in the light emitting element ED may be an organic light emitting layer containing an organic material. In this case, the light emitting element ED may be an organic light emitting diode.

The second transistor T2 may be on/off controlled by a scan signal SCAN applied via the gate line GL and be electrically connected between the first node N1 of the first transistor T1 and the data line DL. The second transistor T2 may be referred to as a switching transistor.

If the second transistor T2 is turned on by the scan signal SCAN, the data voltage Vdata supplied through the data line DL is transferred to the first node N1 of the first transistor T1.

The storage capacitor Cst may be electrically connected between the first node N1 and second node N2 of the first transistor T1.

Each subpixel SP may have a 2T1C structure which includes two transistors T1 and T2 and one capacitor Cst and, in some cases, each subpixel SP may further include one or more transistors or one or more capacitors.

The storage capacitor Cst may be not the parasitic capacitor which may be present between the first node N1 and second node N2 of the first transistor T1, but an external capacitor intentionally designed outside the first transistor T1.

Each of the first transistor T1 and the second transistor T2 may be an n-type transistor or a p-type transistor.

Circuit elements, such as the light emitting element ED, two or more transistors T1 and T2, and one or more capacitors Cst, are disposed on the display panel 110. Since the circuit elements are vulnerable to external moisture or oxygen, an encapsulation layer ENCAP for preventing external moisture or oxygen from penetrating into the circuit elements may be disposed on the display panel 110.

In the touch display device 100 according to embodiments of the disclosure, the touchscreen panel TSP may be formed on the encapsulation layer ENCAP and embedded in the display panel 110. In other words, in the touch display device 100, the plurality of touch electrodes TE constituting the touchscreen panel TSP may be disposed on the encapsulation layer ENCAP to configure the display panel 110.

As a capacitance-based touch sensing scheme, the touch display device 100 may sense a touch using a mutual capacitance scheme or a self-capacitance scheme.

In the case of a mutual capacitance-based touch sensing scheme, the plurality of touch electrodes TE may be divided into touch driving electrodes to which touch driving signals are applied through touch driving lines and touch sensing electrodes where touch sensing signals are sensed through the touch sensing lines and which, together with the touch driving electrodes, form capacitance. In this case, the touch driving line and the touch sensing line may be collectively referred to as a touch line, and the touch driving signal and the touch sensing signal may be collectively referred to as a touch signal.

In the case of such a mutual capacitance-based touch sensing scheme, the presence or absence of a touch and touch coordinates are detected based on a change in the mutual capacitance caused between the touch driving electrode and the touch sensing electrode according to the presence or absence of a pointer, such as a finger or a pen.

In the self-capacitance-based touch sensing scheme, each touch electrode TE plays a role both as a touch driving electrode and as a touch sensing electrode. In other words, the touch driving signal is applied to the touch electrode TE through one touch line, and the touch sensing signal transferred from the touch electrode TE to which the touch driving signal is applied is received through the same touch line. Accordingly, in the self-capacitance-based touch sensing scheme, there is no distinction between the touch driving electrode and the touch sensing electrode and no distinction between the touch driving line and the touch sensing line.

In the case of such a self-capacitance-based touch sensing scheme, the presence or absence of a touch and touch coordinates are detected based on a change in capacitance caused between a pointer, such as a finger or a pen, and the touch electrode TE.

As such, the touch display device 100 may sense a touch in the mutual capacitance-based touch sensing scheme or self-capacitance-based touch sensing scheme.

Figure 4:
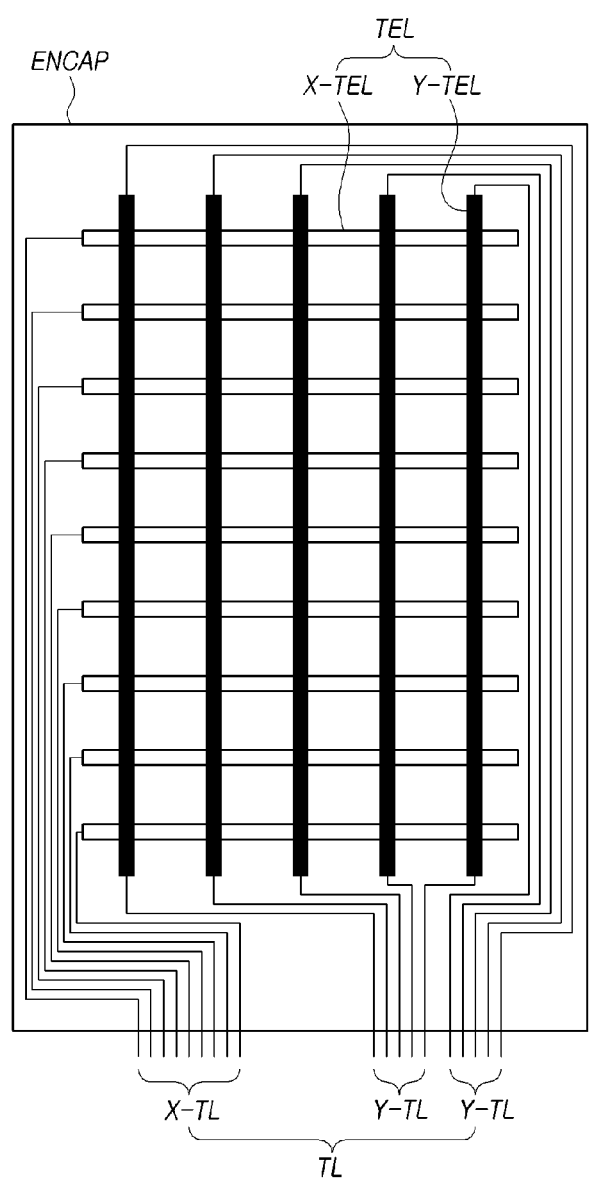
FIG. 4 is a view schematically illustrating a touch electrode structure for mutual capacitance-based touch sensing in a touch display device according to embodiments of the disclosure.

FIG. 4 is a view schematically illustrating a touch electrode structure for mutual capacitance-based touch sensing in a touch display device according to embodiments of the disclosure.

Referring to FIG. 4, a touch electrode structure for mutual capacitance-based touch sensing in the touch display device 100 according to embodiments of the disclosure may include a plurality of X-touch electrode lines X-TEL and a plurality of Y-touch electrode lines Y-TEL. The plurality of X-touch electrode lines X-TEL and the plurality of Y-touch electrode lines Y-TEL are positioned on the encapsulation layer ENCAP.

The plurality of X-touch electrode lines X-TEL each may be disposed in a first direction, and the plurality of Y-touch electrode lines Y-TEL each may be disposed in a second direction different from the first direction.

In the disclosure, the first direction and the second direction may be relatively different directions. As an example, the first direction may be the x-axis direction, and the second direction may be the y-axis direction. In contrast, the first direction may be the y-axis direction, and the second direction may be the x-axis direction. The first direction and the second direction may be, or may not be, perpendicular to each other. In the disclosure, row and column are relative terms, and from a point of view, the terms "row" and "column" may be interchangeably used.

Each of the X-touch electrode lines X-TEL may be constituted of a plurality of X-touch electrodes electrically connected with each other. Each of the Y-touch electrode lines Y-TEL may be constituted of a plurality of Y-touch electrodes electrically connected with each other.

The plurality of X-touch electrodes and the plurality of Y-touch electrodes are included in the plurality of touch electrodes TE and whose roles (functions) are distinguished.

For example, the plurality of X-touch electrodes respectively constituting the plurality of X-touch electrode lines X-TEL may be touch driving electrodes, and the plurality of Y-touch electrodes respectively constituting the plurality of Y-touch electrode lines Y-TEL may be touch sensing electrodes. In this case, the plurality of X-touch electrode lines X-TEL respectively correspond to touch driving electrode lines, and the plurality of Y-touch electrode lines Y-TEL respectively correspond to touch sensing electrode lines.

Conversely, the plurality of X-touch electrodes respectively constituting the plurality of X-touch electrode lines X-TEL may be touch sensing electrodes, and the plurality of Y-touch electrodes respectively constituting the plurality of Y-touch electrode lines Y-TEL may be touch driving electrodes. In this case, the plurality of X-touch electrode lines X-TEL respectively correspond to touch sensing electrode lines, and the plurality of Y-touch electrode lines Y-TEL respectively correspond to touch driving electrode lines.

A touch sensor metal for touch sensing may include a plurality of touch lines TL as well as the plurality of X-touch electrode lines X-TEL and the plurality of Y-touch electrode lines Y-TEL.

The plurality of touch lines TL may include one or more X-touch lines X-TL respectively connected to the plurality of X-touch electrode lines X-TEL and one or more Y-touch lines Y-TL respectively connected to the plurality of Y-touch electrode lines Y-TEL.

Figure 5:
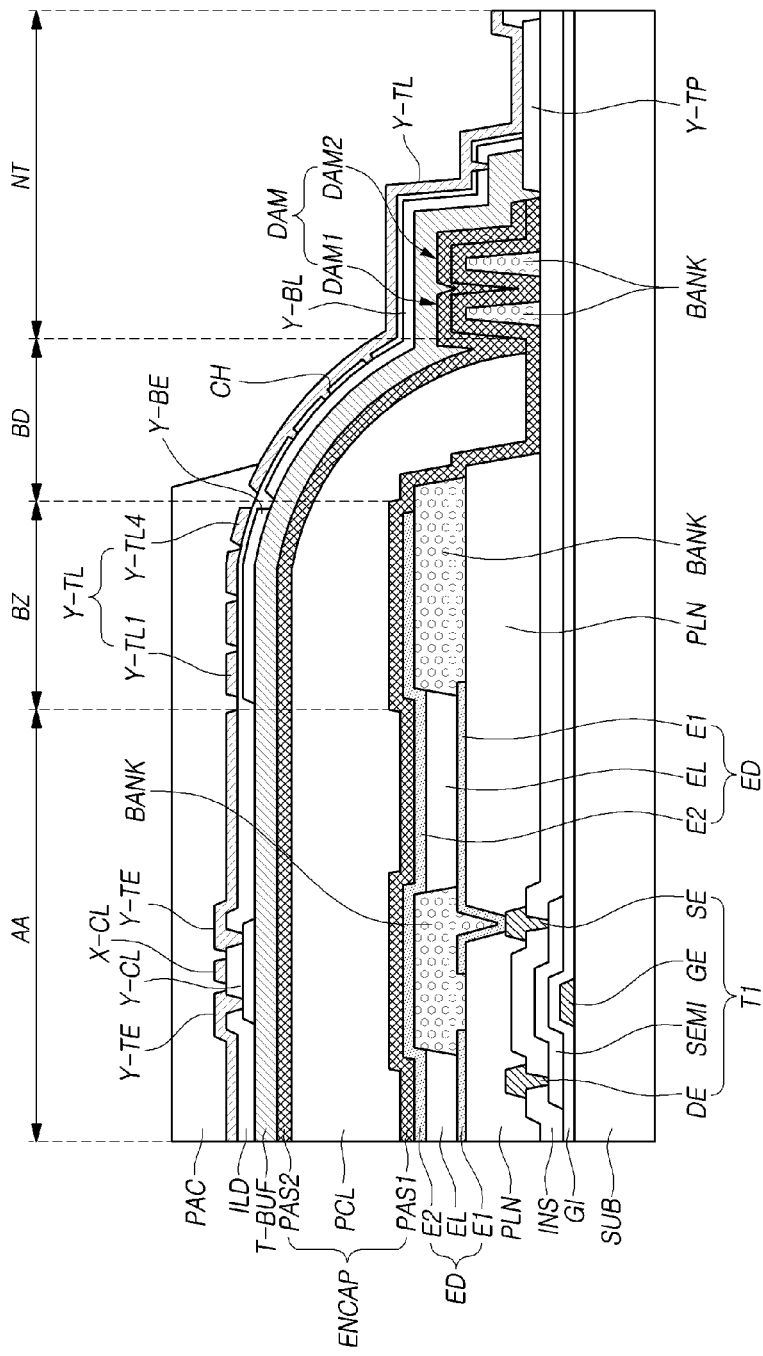
FIG. 5 is a cross-sectional view exemplarily illustrating a touch display device according to embodiments of the disclosure.

FIG. 5 is a cross-sectional view exemplarily illustrating a touch display device according to embodiments of the disclosure.

FIG. 5 illustrates a plate-shaped Y-touch electrode Y-TE, but this is merely an example. For example, a mesh-type touch electrode TE may be used.

Referring to FIG. 5, in the touch display device according to embodiments of the disclosure, a first transistor T1, as a driving transistor, may be disposed on the substrate SUB in the subpixel SP positioned in the display area AA.

The first transistor T1 may include a gate electrode GE, a source electrode SE, a drain electrode DE, and a semiconductor layer SEMI. In this case, the source electrode SE and the drain electrode DE may be formed of the same material as the first node electrode NE1 and the second node electrode NE2 positioned in the bending area BD.

The gate electrode GE and the semiconductor layer SEMI may overlap each other, with the gate insulation film GI interposed therebetween. The source electrode SE may be formed on an insulation layer INS to contact one side of the semiconductor layer SEMI, and the drain electrode DE may be formed on the insulation layer INS to contact the other side of the semiconductor layer SEMI.

The light emitting element ED may include a first electrode E1, which corresponds to the anode electrode (or cathode electrode), a light emitting layer EL formed on the first electrode E1, and a second electrode E2 formed on the light emitting layer EL and corresponding to the cathode electrode (or anode electrode).

The first electrode E1 is electrically connected with the source electrode SE of the first transistor T1, exposed through a contact hole which passes through a planarization film PLN.

The light emitting layer EL is formed on the first electrode E1 in an emission area defined by a bank BANK. The light emitting layer EL may be formed in the order of hole-related layer, light emitting layer, and electron-related layer, or its reverse order, on the first electrode E1. The second electrode E2 may be formed to face the first electrode E1, with the light emitting layer EL disposed therebetween.

The encapsulation layer ENCAP blocks or at least reduces penetration of external moisture or oxygen into the light emitting element ED which is vulnerable to external moisture or oxygen. The encapsulation layer ENCAP may be formed of one layer or may include a stacked structure of a plurality of layers PAS1, PCL, and PAS2.

For example, where the encapsulation layer ENCAP is formed of a stacked structure of a plurality of layers PAS1, PCL, and PAS2, the encapsulation layer ENCAP may include one or more inorganic encapsulation layers PAS1 and PAS2 and one or more organic encapsulation layer PCL. As a specific example, in the encapsulation layer ENCAP, the first inorganic encapsulation layer PAS1, the organic encapsulation layer PCL, and the second inorganic encapsulation layer PAS2 may be stacked in the order thereof.

The encapsulation layer ENCAP may further include at least one organic encapsulation layer or at least one inorganic encapsulation layer.

The first inorganic encapsulation layer PAS1 is formed on the substrate SUB where the second electrode E2 corresponding to the cathode electrode is formed, to be positioned most adjacent to the light emitting element ED. The first inorganic encapsulation layer PAS1 is formed of an inorganic insulation material capable of low-temperature deposition, such as for example, silicon nitride (SiNx), silicon oxide (SiOx), silicon oxynitride (SiON), or aluminum oxide (Al2O3). Since the first inorganic encapsulation layer PAS1 is deposed at low-temperature atmosphere, the first inorganic encapsulation layer PAS1 may prevent damage to the light emitting layer EL including the organic material vulnerable to high-temperature atmosphere during deposition.

The organic encapsulation layer PCL may be formed in a smaller area than the first inorganic encapsulation layer PAS1 in which case the organic encapsulation layer PCL may be formed to expose both end tips of the first inorganic encapsulation layer PAS1. The organic encapsulation layer PCL serves to mitigate stress between the layers due to a warping of the touch display device 100 which is an OLED device, while reinforcing the planarization performance. The organic encapsulation layer PCL may be formed of, e.g., an acrylic resin, epoxy resin, polyimide, polyethylene, silicon oxycarbide (SiOC), or other organic insulation materials.

Where the organic encapsulation layer PCL is formed in an inkjet method, one or more dams DAM may be formed in the boundary area between the non-display area and the display area AA or the dam area which corresponds to a portion of the non-display area.

For example, the dam area may be positioned between the display area AA and the pad area where the plurality of touch pads are formed in the non-display area and, in the dam area, a primary dam DAM1 adjacent to the display area AA, and a secondary dam DAM2 adjacent to the pad area may exist.

The one or more dams DAM disposed in the dam area may prevent or at least reduce the liquid-state organic encapsulation layer PCL from collapsing to the non-display area and resultantly penetrating into the pad area when the liquid-phase organic encapsulation layer PCL is loaded on the display area AA.

The primary dam DAM1 or the secondary dam DAM2 may be formed in a single-layer structure or multi-layer structure. For example, the primary dam DAM1 or the secondary dam DAM2 may simultaneously be formed of the same material as at least one of the bank BANK and a spacer (not shown). In this case, a dam structure may be formed without a masking process or cost rise.

The primary dam DAM1 or the secondary dam DAM2 may be structured so that the first inorganic encapsulation layer PAS1 and the second inorganic encapsulation layer PAS2 are stacked on the bank BANK. In this case, the organic encapsulation layer PCL containing an organic material may be positioned on an inner surface of the primary dam DAM1 or be positioned on the top of at least a portion of the primary dam DAM1 and the secondary dam DAM2.

The second inorganic encapsulation layer PAS2 may be formed over the substrate SUB, where the organic encapsulation layer PCL is formed, to cover the upper surface and side surfaces of each of the organic encapsulation layer PCL and the first inorganic encapsulation layer PAS1. The second inorganic encapsulation layer PAS2 reduces or blocks penetration of external moisture or oxygen into the first inorganic encapsulation layer PAS1 and the organic encapsulation layer PCL. The second inorganic encapsulation layer PAS2 is formed of an inorganic insulation material, such as, e.g., silicon nitride (SiNx), silicon oxide (SiOx), silicon oxynitride (SiON), or aluminum oxide (Al2O3).

A touch buffer layer T-BUF may be disposed on the encapsulation layer ENCAP. The touch buffer layer T-BUF may be positioned between the touch sensor metal including the touch electrodes X-TE and Y-TE and the touch electrode connection lines X-CL and Y-CL, and the second electrode E2 of the light emitting element ED.

The touch buffer layer T-BUF may be designed to maintain a predetermined minimum spacing (e.g., 1 μm) between the touch sensor metal and the second electrode E2 of the light emitting element ED. Thus, it is possible to reduce or prevent the parasitic capacitance formed between the touch sensor metal and the second electrode E2 of the light emitting element ED and hence reduce or prevent deterioration of touch sensitivity due to parasitic capacitance.

In contrast, without the touch buffer layer T-BUF, the touch sensor metal including the touch electrodes X-TE and Y-TE and the touch electrode connection lines X-CL and Y-CL may be disposed on the encapsulation layer ENCAP.

The touch buffer layer T-BUF may block or at least reduce penetration, into the organic material-containing light emitting layer EL, of external moisture or the chemical (e.g., developer or etchant) used while manufacturing the touch sensor metal disposed on the touch buffer layer T-BUF. Thus, the touch buffer layer T-BUF may prevent damage to the light emitting layer EL vulnerable to chemicals or moisture.

The touch buffer layer T-BUF may be formed of an organic insulation material with a low permittivity and formed at a low temperature which is not more than a predetermined temperature (e.g., 100° C.) to prevent or at least reduce damage to the light emitting layer EL containing the organic material vulnerable to high temperature. For example, the touch buffer layer T-BUF may be formed of an acrylic-based, epoxy-based, or siloxane-based material. The touch buffer layer T-BUF with planarizability, formed of an organic insulation material, may prevent fracture of the touch sensor metal formed on the touch buffer film T-BUF and damage to the internal layers PAS1, PCL, and PAS2 constituting the encapsulation layer ENCAP due to a warping of the OLED device.

In a mutual-capacitance-based touch sensor structure, the X-touch electrode line X-TEL and the Y-touch electrode line Y-TEL may be formed on the touch buffer layer T-BUF, and the X-touch electrode line X-TEL and the Y-touch electrode line Y-TEL may be disposed to cross each other. The Y-touch electrode line Y-TEL may include a plurality of Y-touch electrode connection lines Y-CL that electrically connect the plurality of Y-touch electrodes Y-TE.

In this case, the plurality of Y-touch electrodes Y-TE and the plurality of Y-touch electrode connection lines Y-CL may be positioned on different layers, with the inter-layer dielectric ILD interposed therebetween.

The plurality of Y-touch electrodes Y-TE may be spaced apart at a predetermined interval along the y axis direction. The plurality of Y-touch electrodes Y-TE may be electrically connected with another Y-touch electrode Y-TE adjacent thereto in the y axis direction via the Y-touch electrode connection line Y-CL.

The Y-touch electrode connection line Y-CL may be formed on the touch buffer layer T-BUF and be exposed via the touch contact hole passing through the inter-layer dielectric ILD and be electrically connected with two Y-touch electrodes Y-TE adjacent in the y axis direction.

The Y-touch electrode connection line Y-CL may be disposed to overlap the bank BANK. Thus, it is possible to prevent or at least reduce a reduction in the aperture ratio due to the Y-touch electrode connection line Y-CL.

The X-touch electrode line X-TEL may include a plurality of X-touch electrode connection lines X-CL that electrically connect the plurality of X-touch electrodes X-TE. The plurality of X-touch electrodes X-TE and the plurality of X-touch electrode connection lines X-CL may be positioned on different layers, with the inter-layer dielectric ILD disposed therebetween.

The plurality of X-touch electrodes X-TE may be spaced apart at a predetermined interval along the x axis direction, on the inter-layer dielectric ILD. The plurality of X-touch electrodes X-TE may be electrically connected with another X-touch electrode X-TE adjacent thereto in the x axis direction via the X-touch electrode connection line X-CL.

The X-touch electrode connection line X-CL may be disposed on the same plane as the X-touch electrode X-TE and be electrically connected with two X-touch electrodes X-TE adjacent thereto in the x axis direction without a separate contact hole or be integrated with the two X-touch electrodes X-TE adjacent thereto each other in the x axis direction.

The X-touch electrode connection line X-CL may be disposed to overlap the bank BANK. Thus, it is possible to prevent a reduction in the aperture ratio due to the X-touch electrode connection line X-CL.

The Y-touch electrode line Y-TEL may be electrically connected with the touch driving circuit 150 via the Y-touch line Y-TL and the Y-touch pad Y-TP. Likewise, the X-touch electrode line X-TEL may be electrically connected with the touch driving circuit 150 via the X-touch line X-TL and the X-touch pad (not shown).

A pad cover electrode may be further provided to cover the X-touch pad and the Y-touch pad Y-TP.

The X-touch pad may be formed separately from the X-touch line X-TL or may extend from the X-touch line X-TL. The Y-touch pad Y-TP may be formed separately from the Y-touch line Y-TL or may extend from the Y-touch line Y-TL.

Where the X-touch pad extends from the X-touch line X-TL, and the Y-touch pad Y-TP extends from the Y-touch line Y-TL, the X-touch pad, the X-touch line X-TL, the Y-touch pad Y-TP, and the Y-touch line Y-TL may be formed of the same first conductive material. The first conductive material may be formed in a single-layer or multi-layer structure using a metal with good corrosion or acid resistance or electric conductivity, such as Al, Ti, Cu, or Mo.

For example, the X-touch pad, X-touch line X-TL, Y-touch pad Y-TP, and Y-touch line Y-TL formed of the first conductive material may be formed in a three-layer stacked structure, such as Ti/Al/Ti or Mo/Al/Mo.

The pad cover electrode capable of covering the X-touch pad and Y-touch pad Y-TP may be formed of a second conductive material which is the same material as the X-touch electrode and Y-touch electrode X-TE and Y-TE. The second conductive material may be formed of a transparent conductive material, such as ITO or IZO, which has high corrosion or acid resistance. The pad cover electrode may be formed to be exposed by the touch buffer layer T-BUF and be thus bonded with the touch driving circuit 150 or a circuit film where the touch driving circuit 150 is mounted.

The touch buffer layer T-BUF may be formed to cover the touch sensor metal, preventing or at least reducing corrosion to the touch sensor metal by external moisture. As an example, the touch buffer layer T-BUF may be formed of an organic insulation material or as a circular polarizer or epoxy or acrylic film. The touch buffer layer T-BUF on the encapsulation layer ENCAP may be omitted. In other words, the touch buffer layer T-BUF may not be an essential component.

The Y-touch line Y-TL may be electrically connected with the Y-touch electrode via the touch line contact hole or be integrated with the Y-touch electrode Y-TE.

The Y-touch line Y-TL may extend up to the non-display area and be electrically connected with the Y-touch pad Y-TP via the top and side of the encapsulation layer ENCAP and the top and side of the dam DAM. Thus, the Y-touch line Y-TL may be electrically connected with the touch driving circuit 150 via the Y-touch pad Y-TP.

The Y-touch line Y-TL may transfer the touch sensing signal from the Y-touch electrode Y-TE to the touch driving circuit 150 or may receive the touch driving signal from the touch driving circuit 150 and transfer the touch driving signal to the Y-touch electrode Y-TE.

In this case, in the notch area NT and bending area BD, the Y-touch bridge line Y-BL connected through the contact hole CH may be disposed under the Y-touch line Y-TL. Since the Y-touch line Y-TL and the Y-touch bridge line Y-BL are electrically connected through at least one contact hole CH formed at regular intervals, the same touch driving signal or touch sensing signal may be transferred.

As such, when the Y-touch line Y-TL and the Y-touch bridge line Y-BL are electrically connected, the electrical resistance may be reduced during the transfer of the touch driving signal or the touch sensing signal. Further, when connecting the Y-touch line Y-TL and the Y-touch bridge line Y-BL through a plurality of contact holes CH, the touch signal (touch driving signal or touch sensing signal) may get around through the contact hole CH although a disconnection occurs in the Y-touch line Y-TL or Y-touch bridge line Y-BL in some section, so that the performance of touch sensing may be maintained.

The area other than the contact hole CH may be insulated by the inter-layer dielectric ILD disposed between the Y-touch line Y-TL and the Y-touch bridge line Y-BL.

A plurality of Y-touch lines Y-TL1, Y-TL2, Y-TL3, and Y-TL4 may be disposed in the bezel area BZ, and the Y-touch bridge electrode Y-BE having an integrated structure may be disposed thereunder.

The Y-touch bridge electrode Y-BE may have an integrated structure and be formed to have the same width or a larger width than the Y-touch lines Y-TL1, Y-TL2, Y-TL3, and Y-TL4 to be able to cover the area occupied by the Y-touch lines Y-TL1, Y-TL2, Y-TL3, and Y-TL4 positioned thereabove.

In this case, the Y-touch bridge electrode Y-BE is connected to a ground voltage GND to discharge the noise charge introduced into the display panel 110 and is separated from the Y-touch bridge line Y-BL or the second node electrode NE2 positioned in the bending area BD.

Thus, the noise charge introduced to the display panel 110 may easily be discharged to the ground voltage GND by the Y-touch bridge electrode Y-BE formed in an integrated structure to be able to cover the area occupied by the Y-touch lines Y-TL1, Y-TL2, Y-TL3, and Y-TL4, so that the touch sensing performance of the touch display device 100 may be reduced, and defects during display driving may be reduced.

The X-touch line X-TL may be electrically connected with the X-touch electrode X-TE via the touch line contact hole or may be integrated with the X-touch electrode X-TE.

The X-touch line X-TL may extend up to the non-display area and be electrically connected with the X-touch pad (not shown) via the top and side of the encapsulation layer ENCAP and the top and side of the dam DAM. Thus, the X-touch line X-TL may be electrically connected with the touch driving circuit 150 via the X-touch pad.

The X-touch line X-TL may receive the touch driving signal form the touch driving circuit 150 and transfer the touch driving signal to the X-touch electrode X-TE and may transfer the touch sensing signal from the X-touch electrode X-TE to the touch driving circuit 150.

Various changes may be made to the arrangement of the X-touch line X-TL and the Y-touch line Y-TL depending on the design of the display panel 110.

A touch protection film PAC may be disposed on the X-touch electrode X-TE and the Y-touch electrode Y-TE. The touch protection film PAC may extend up to before or after the dam DAM and may thus be disposed even on the X-touch line X-TL and the Y-touch line Y-TL.

The cross-sectional views herein illustrate a conceptual structure of a touch display device 100. Depending on the direction or position in which it is viewed, the position, thickness, or width of each pattern (e.g., various layers or electrodes) may be varied, and the connection structure of various patterns may be varied, and an additional layer other than the layers shown may be present as well, or some of the layers may be omitted or combined. For example, the width of the bank BANK may be narrower than that shown in the drawings, and the height of the dam DAM may be higher or lower than shown.

The touch display device 100 may be used in mobile devices, such as smart phones and tablet PCs, and may also be used in large-screen display devices, such as automobile displays and exhibition displays.

The touch display device 100 may be one of various types of devices, such as liquid crystal display devices, organic light emitting display devices, plasma display panels, or quantum dot displays.

For example, when the touch display device 100 according to embodiments of the disclosure is a liquid crystal display device, the plurality of touch electrodes TE may be disposed on the display panel 110 and be common electrodes to which a DC-level common voltage is applied for display driving.

As another example, when the touch display device 100 according to embodiments of the disclosure is an organic light emitting display device, the touch display device 100 may include a first electrode (anode electrode), an organic light emitting layer, and a second electrode (cathode electrode), which constitute an organic light emitting diode, an encapsulation layer positioned thereon to provide a sealing function, and a touch sensor metal layer positioned thereon. In this case, the plurality of touch electrodes TE may be formed on the touch sensor metal layer or may be formed as the second electrode layer constituting the cathode electrode of the organic light emitting diode.

The DC voltage applied to the touch electrode TE may be applied at a specific voltage level within the display driving period.

In this case, the display panel 110 may be of a split type in which each of the plurality of touch electrodes TE is separated from another, or a woven type in which touch electrodes TE of different sizes are disposed in adjacent rows (or columns).

Figure 6:
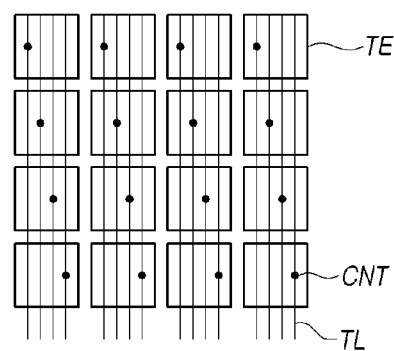
FIG. 6 is a view illustrating a display panel in which split-type touch electrodes are arranged in a touch display device according to embodiments of the disclosure.

FIG. 6 is a view illustrating a display panel in which split-type touch electrodes are arranged in a touch display device according to embodiments of the disclosure.

Referring to FIG. 6, in the case of the display panel 110 having split-type touch electrodes TE of the same shape in the touch display device 100 according to embodiments of the disclosure, each of the plurality of touch electrodes TE may be electrically connected with the touch line TL where the touch driving signal or touch sensing signal is transferred through one or more contact holes CNT.

The plurality of touch electrodes TE may be positioned in the display area of the display panel 110. In some cases, some (e.g., the outermost touch electrodes) of the plurality of touch electrodes TE may be positioned in an area (outer area) outside the display area or extend up to the area (outer area) outside the display area. The display area may be an area where an image is displayed or an area where touch sensing is possible.

In this case, the plurality of touch lines TL electrically connected to the plurality of touch electrodes TE may be positioned in the display area. In some cases, all or some the touch lines TL may be positioned outside the display area. When the plurality of touch lines TL electrically connected to the plurality of touch electrodes TE are positioned in the display area, the plurality of touch lines TL may be positioned on a different layer from the plurality of touch electrodes TE and overlap the plurality of touch electrodes TE.

All of the plurality of touch lines TL may have the same or similar lengths and be disposed from points connected to the touch driving circuit 150 to the opposite points. Each of the plurality of touch lines TL may differ only in the position electrically connected to the corresponding touch electrode TE (i.e., the position of the contact hole CNT).

In the case of the split-type display panel 110, if one touch electrode TE is electrically connected to one touch line TL, as many touch lines TL as the number of touch electrodes TE will be required. The number of touch lines TL corresponds to the number of touch channels for signal input/output of the touch driving circuit 150.

Accordingly, in the case of a split type including 4×4 touch electrodes TE, 16 touch lines TL respectively connected to the 16 touch electrodes TE are disposed, so that at least 16 touch channels are required.

The touch display device 100 of the disclosure may be formed in a woven type in which touch electrodes TE of different sizes are disposed in adjacent rows or columns, rather than a split type in which each of the plurality of touch electrodes TE is separated from another.

Figure 7:
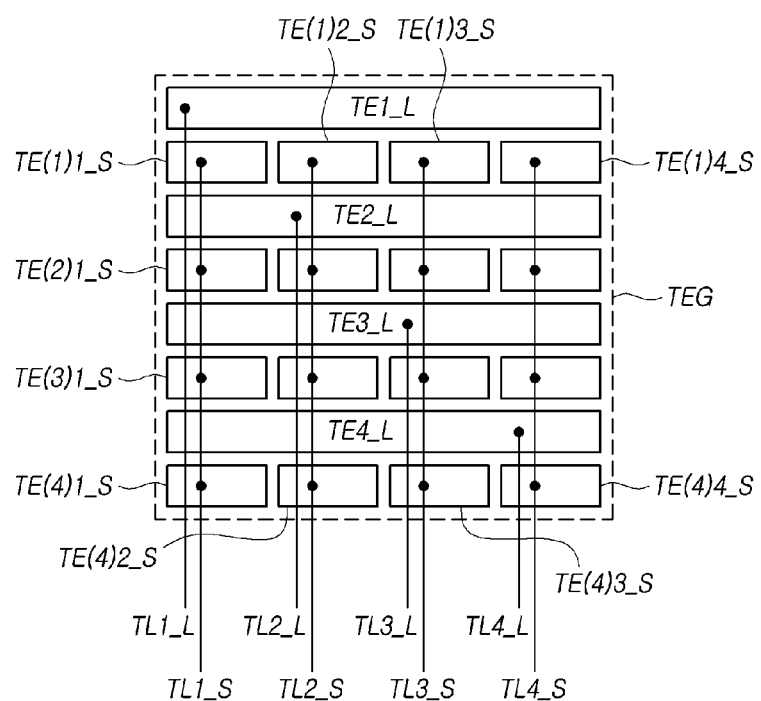
FIG. 7 is a view illustrating an example of a display panel in which woven-type touch electrodes are arranged in a touch display device according to embodiments of the disclosure.

FIG. 7 is a view illustrating an example of a display panel in which woven-type touch electrodes are arranged in a touch display device according to embodiments of the disclosure.

Referring to FIG. 7, in the touch display device 100 according to embodiments of the disclosure, the woven-type display panel 110 may include touch electrode groups TEG each including a plurality of (e.g., four) long touch electrodes TE1_L to TE4_L and a plurality of (e.g., four) short touch electrodes TE1_S to TE4_S connected in the same line.

In other words, the long touch electrodes TE1_L, TE2_L, TE3_L, and TE4_L elongated in the row direction may correspond to the length of the four short touch electrodes TE(1)1_S, TE(1)2_S, TE(1)3_S, and TE(1)4_S and, in this case, the four short touch electrodes (e.g., TE(1)1_S, TE(2)1_S, TE(3)1_S, and TE(4)1_S) in the column direction may be connected to one short touch line (e.g., TL1_S). Accordingly, four short touch electrodes disposed in the column direction may be connected by one same line to constitute one short touch electrode block, and four long touch electrodes and four short touch electrode blocks corresponding thereto and connected by the same line may form one touch electrode group TEG.

In the case of a woven-type 4×4 touch electrode structure, the number of touch electrodes in the row in which long touch electrode is disposed among two adjacent rows corresponds to ¼ of the number of touch electrodes in the row in which the short touch electrodes are disposed. Accordingly, the lengths of the long touch electrode TE1_L, TE2_L, TE3_L, and TE4_L are about four times the length of the short touch electrode TE1_S to TE4_S.

In this case, the woven-type 4×4 touch electrode structure includes four long touch electrodes TE1_L, TE2_L, TE3_L, and TE4_L and 16 short touch electrodes TE(1)1_S, TE(1)2_S, TE(1)3_S, and TE(1)4_S to TE(4)1_S, TE(4)2_S, TE(4)3_S, and TE(4)4_S), but the four short touch electrodes in the column direction (e.g., TE(1)1_S, TE(2)1_S, TE(3)1_S, and TE(4)1_S) are connected to one short touch line (e.g., TL1_S).

Therefore, as four short touch electrodes (e.g., TE(1)1_S, TE(2)1_S, TE(3)1_S, and TE(4)1_S) connected to the short touch line (e.g., TL1_S) form one short touch electrode block connected by the same line, 16 short touch electrodes TE(1)1_S, TE(1)2_S, TE(1)3_S, and TE(1)4_S to TE(4)1_S, TE(4)2_S, TE(4)3_S, and TE(4)4_S constitute four short touch electrode blocks connected by the same line.

As a result, one long touch line TL1_L, TL2_L, TL3_L, and TL4_L is connected to the four long touch electrodes TE1_L, TE2_L, TE3_L, and TE4_L, and the short touch lines TL1_S, TL2_S, TL3_S, and TL4_S are connected one by one to the four short touch electrode blocks each connected by the same line. Thus, in the case of the woven-type 4×4 touch electrode structure, eight touch lines TL1_L, TL2_L, TL3_L, TL4L, TL1_S, TL2_S, TL3_S, and TL4_S and 8 touch channels are required.

Therefore, as compared with the split-type touch electrode structure, the woven-type touch electrode structure may reduce the number of touch lines and the number of touch channels.

Although the size of the touch electrode group TEG may be varied, the size of the touch electrode group TEG may be determined considering the distance from a finger or a stylus for multi-touch detection to efficiently arrange the touch electrodes TE on the display panel 110 and increase the accuracy of multi-touch detection.

A plurality of woven-type touch electrode groups TEG may be disposed on the display panel 110 in a horizontal direction and a vertical direction in which case each touch electrode group TEG may be electrically separated in the display area where an image is displayed but may be connected to the touch driving circuit 150 through the touch line TL in the non-display area where no image is displayed.

Figure 8:
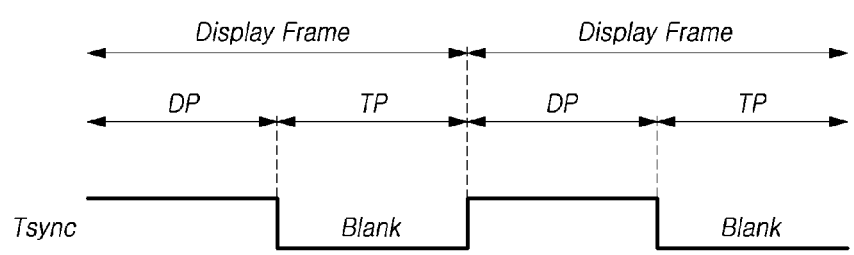
FIG. 8 is a timing diagram illustrating a display driving period and a touch driving period in a touch display device according to embodiments of the disclosure.

FIG. 8 is a timing diagram illustrating a display driving period and a touch driving period in a touch display device according to embodiments of the disclosure.

Referring to FIG. 8, the touch display device 100 according to embodiments of the disclosure may perform display driving for image display during a predetermined display driving period DP within one display frame period Display Frame and may perform touch driving for sensing a touch input by a finger or a stylus during a predetermined touch driving period TP within one display frame period Display Frame.

The touch display device 100 may share each electrode for pixel driving, as the electrode for touch detection. Accordingly, a DC voltage is supplied to the thin film transistor connected to the touch electrode during the display driving period DP, and a pulse-form touch driving signal is supplied to the touch electrode during the touch driving period TP.

The display driving period DP and the touch driving period TP may be temporally identical or overlap each other or be temporally separated periods.

When the display driving period DP and the touch driving period TP are temporally separated may be referred to as time division driving.

When the display driving period DP and the touch driving period TP are temporally identical, display driving and touch driving may be performed simultaneously, and such driving scheme may be referred to as time free driving.

In the case of time division driving, the display driving period DP and the touch driving period TP may alternate.

As such, when the display driving period DP and the touch driving period TP are temporally separated while alternating, the touch driving period TP may correspond to a blank period when display driving is not performed.

The touch display device 100 may generate a touch synchronization signal Tsync swinging between a high level and a low level, thereby identifying or controlling the display driving period DP and the touch driving period TP. In other words, the touch synchronization signal Tsync may be a timing control signal defining the touch driving period TP.

For example, a high-level period (or a low-level period) of the touch synchronization signal Tsync may correspond to the display driving period DP, and the low-level period (or high-level period) of the touch synchronization signal Tsync may correspond to the touch driving period TP.

In this case, the touch driving circuit 150 may apply the touch driving signal to the touch electrode TE during the touch driving period TP in which the touch synchronization signal Tsync is at the low level and may sense the presence or absence of a touch and the touch position of the passive stylus or the active stylus using the touch sensing signal received from the touch electrode TE.

In relation to the scheme of allocating the display driving period DP and the touch driving period TP within one display frame period Display Frame, one display frame period Display Frame may be divided into one display driving period DP and one touch driving period TP, and display driving may be performed during the display driving period DP and touch driving for sensing the touch input by the passive stylus and the active stylus may be performed during the touch driving period TP.

In other words, the touch display device 100 may perform driving for a touch once during the display frame period Display Frame which is one period of the frame frequency or the screen change period (refresh rate) of the display panel 110.

For example, when the frame frequency is 60 Hz, display driving of turning on or off the pixels through N gate lines constituting the display panel 110 within a period of 1/60s is performed, and then, the touch driving period TP for touch sensing proceeds for a predetermined interval. In this case, the touch detection frequency (touch report rate) will be 60 Hz.

As another example, one display frame period Display Frame may be divided into two or more display driving periods DP and two or more touch driving periods TP. Display driving may be performed during two or more display driving periods DP within one display frame period Display Frame, and touch driving for sensing one or two or more touch inputs by the passive stylus and the active stylus in the whole or part of the screen may be performed during two or more touch driving periods TP.

As such, when one display frame period Display Frame is divided into two or more display driving periods DP and two or more touch driving periods TP, and display driving and touch driving are performed, each of two or more blank periods Blank corresponding to two or more touch driving periods TP within one display frame period Display Frame is referred to as a long horizontal blank (LHB).

Accordingly, two or more periods when touch sensing of a stylus or a finger is performed within the display frame period Display Frame may be referred to as an LHB or touch driving period TP, and touch driving performed during two or more LHBs within one display frame period Display Frame may be referred to as "LHB driving."

Figure 9:
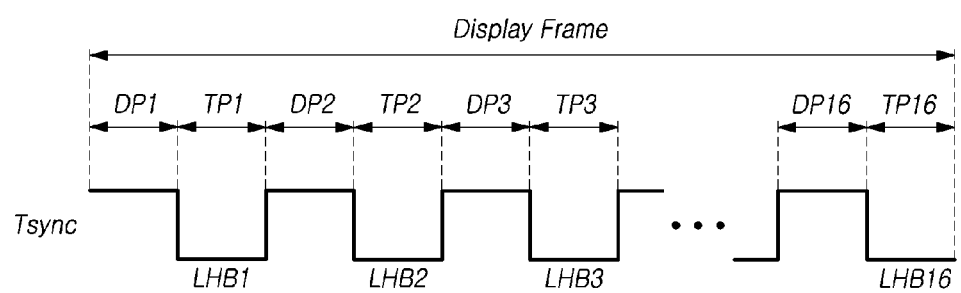
FIG. 9 is an example long horizontal blank (LHB) driving timing diagram in a touch display device according to embodiments of the disclosure.

FIG. 9 is an example LHB driving timing diagram in a touch display device according to embodiments of the disclosure.

Referring to FIG. 9, in the touch display device 100 according to embodiments of the disclosure, one display frame period Display Frame may be time-divided into 16 display driving periods DP1 to DP16 and 16 touch driving periods TP1 to TP16.

In this case, the 16 touch driving periods TP1 to TP16 may correspond to 16 LHBs LHB1 to LHB16.

In this case, the touch display device 100 may divide one display frame period Display Frame into one or more display driving periods DP1 to DP16 and one or more touch driving periods TP1 to TP16 to alternately perform display driving and touch driving.

Alternatively, the touch driving period TP1 to TP16 may proceed independently of the display driving period DP1 to DP16.

Figure 10:
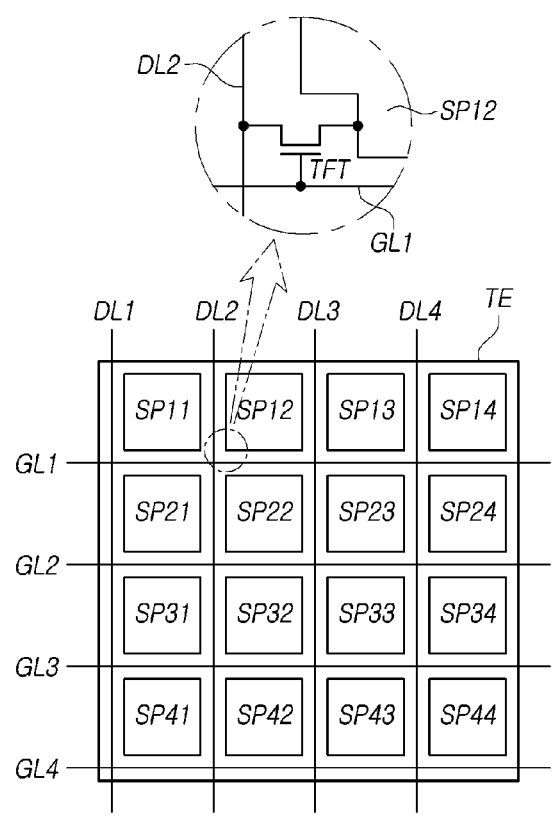
FIG. 10 is a view illustrating a portion of a touch electrode area in a touch display device according to embodiments of the disclosure.

FIG. 10 is a view illustrating a portion of a touch electrode area in a touch display device according to embodiments of the disclosure.

Referring to FIG. 10, the touch display device 100 according to embodiments of the disclosure may include thin film transistors TFT formed on a substrate, subpixel electrodes SP11 to SP44 connected to the drain nodes or source nodes of the thin film transistors, and a touch electrode TE formed to overlap the subpixel electrodes to form an electric field.

The gate node of the thin film transistor TFT is connected to the gate line, and is controlled for on/off according to the scan signal, and the source node or drain node is connected to the data line DL to which the data voltage is supplied.

In this case, when a passive stylus, such as a finger, or an active stylus touches the display panel 110, the touch display device 100 recognizes a change in the capacitance of the touch electrode TE close to the contact position of the stylus to detect the position of the touch. In other words, the position of the touch may be detected by detecting the capacitance change in each of the touch electrodes TE by applying the touch driving signal to the touch electrode TE formed on the display panel 110 and then detecting the touch sensing signal received from the touch electrodes TE.

In this case, a DC voltage or a touch signal is applied to the touch electrode TE of the touch display device 100, and a parasitic capacitance coupled to the touch electrode TE may be created. For example, a parasitic capacitance may be created between the gate line and the touch electrode TE by the scan signal applied to the display panel 110 through the gate line. The parasitic capacitance may increase the load on the touch electrode TE, causing distortion in the DC voltage supplied to the touch electrode TE and a defective line on the display panel 110.

Figure 11:
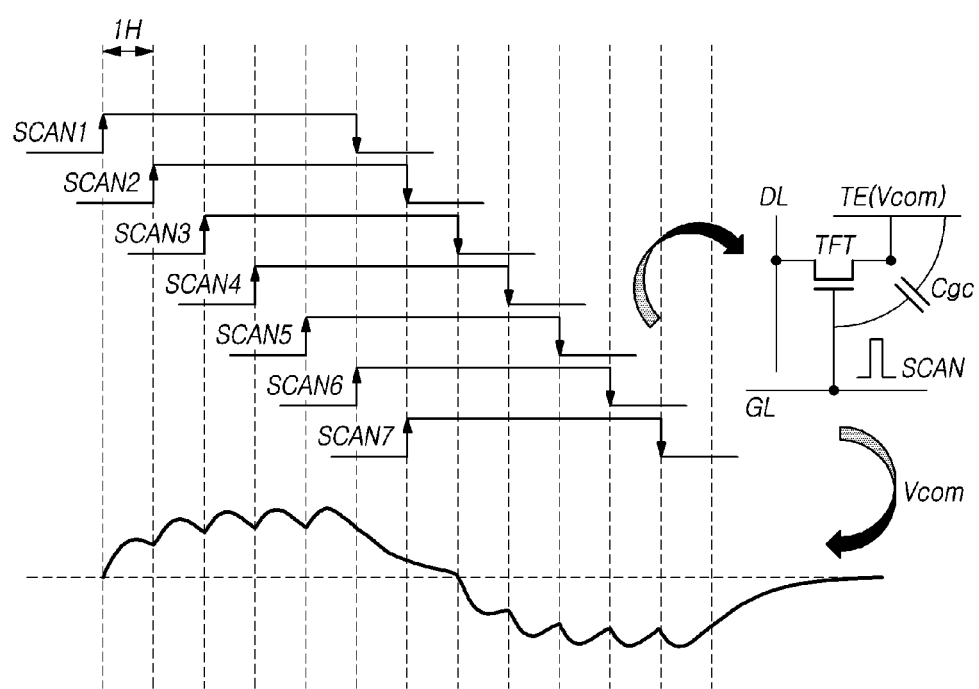
FIG. 11 is a conceptual view illustrating an overlap distortion caused by a load deviation in touch electrode during a display driving period and an overlap of scan signals in a touch display device according to embodiments of the disclosure.

FIG. 11 is a conceptual view illustrating an overlap distortion caused by a load deviation in a touch electrode during a display driving period and an overlap of scan signals in a touch display device according to embodiments of the disclosure.

Referring to FIG. 11, in the touch display device 100 according to embodiments of the disclosure, the scan signals SCAN supplied to the display panel 110 through the gate line may be sequentially transmitted at intervals of one horizontal period 1H.

In this case, the scan signal SCAN may maintain a high level for a predetermined period. In the illustrated example, the scan signal SCAN has a high level period of 5 horizontal periods 5H.

As such, when the scan signal SCAN supplied to the display panel 110 through the gate line GL has a predetermined high level period and is supplied at intervals of one horizontal period 1H, a period when adjacent scan signals SCAN overlap each other occurs. A parasitic capacitance Cgc may be created between the gate line GL and the touch electrode TE due to the overlapping period of the scan signals SCAN.

In other words, the parasitic capacitance Cgc is accumulated between the gate node of the thin film transistor TFT and the touch electrode TE to which the DC voltage Vcom is applied, causing an increase in the load on the touch electrode TE and resultantly distorting the DC voltage Vcom.

The distortion of the DC voltage Vcom may vary depending on the shape of the touch electrode TE to which the touch signal is supplied.

The size of the touch electrode TE disposed on the display panel 110 may correspond to the size of the area of one subpixel and may correspond to the size of the area of two or more subpixels. Each touch electrode TE may be of a plate type having no opening or a mesh type having one or more openings.

When one touch electrode TE is of the mesh type and has a size corresponding to the size of the area of two or more subpixels, one touch electrode TE may have two or more openings, and the position and size of each of the two or more openings may correspond to the position and size of the emission area of the subpixel.

Figure 12:
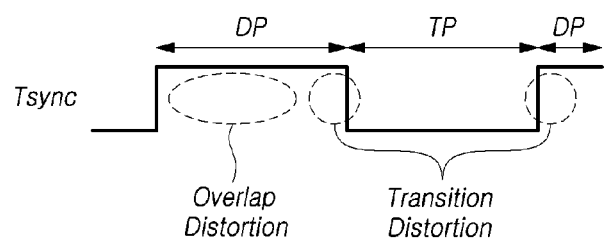
FIG. 12 is a view illustrating a type of a DC voltage distortion caused between a gate line and a touch electrode in a touch display device according to embodiments of the disclosure.
Figure 13:
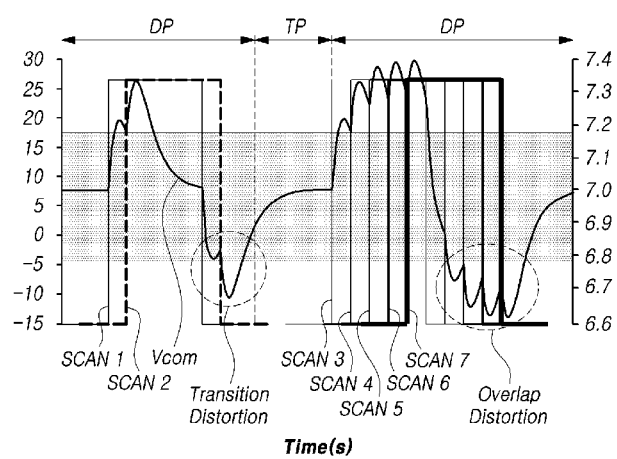
FIG. 13 is a signal waveform diagram illustrating a DC voltage distortion.

FIG. 12 is a view illustrating a type of a DC voltage distortion caused between a gate line and a touch electrode in a touch display device according to embodiments of the disclosure, and FIG. 13 is a signal waveform diagram illustrating a DC voltage distortion.

Referring to FIGS. 12 and 13, the touch display device 100 according to embodiments of the disclosure may perform display driving for image display during a predetermined display driving period DP within one display frame period and may perform touch driving for sensing a touch input by a finger or a stylus during a predetermined touch driving period TP.

In this case, the touch electrode TE for touch detection may be used as an electrode for driving each pixel. Accordingly, a DC voltage is supplied to the touch electrode during the display driving period DP, and a pulse-form touch driving signal is supplied to the touch electrode during the touch driving period TP.

In this case, while entering from the display driving period DP to the touch driving period TP, the operation of the gate driving circuit 120 is temporarily stopped and, at the time when the display driving period DP is started after the touch driving period TP is terminated, the operation of the gate driving circuit 120 is resumed.

As described above, when the scan signals overlap in the period when the gate driving circuit 120 operates discontinuously, distortion of the DC voltage Vcom occurs in some gate lines, causing a difference in luminance and resultantly a defect, such as horizontal lines. In the illustrated example, a distortion of the DC voltage Vcom occurs during entry from the display driving period DP to the touch driving period TP due to an overlap between the first scan signal SCAN1 and the second scan signal SCAN2.

As described above, a defect occurring during the transition between the display driving period DP and the touch driving period TP may be referred to as transition distortion.

Further, the scan signals supplied through the gate line during the display driving period DP may overlap in a predetermined period, so that the parasitic capacitance formed between the gate node of the thin film transistor and the touch electrode may be accumulated. In the illustrated example, a distortion of the DC voltage Vcom occurs during the display driving period DP due to an overlap between the third scan signals SCAN3 to the seventh scan signal SCAN7.

Such parasitic capacitance may increase the load on the touch electrode, causing distortion of the DC voltage and hence defects, such as horizontal lines, due to differences in luminance. As described above, a defect caused by the overlap between scan signals and the load deviation in the touch electrode within the display driving period DP may be referred to as overlap distortion.

Such overlap distortion may occur in the display driving period DP but, in the case of time free driving in which display driving and touch driving are performed simultaneously, may also occur in the touch driving period TP because a scan signal is supplied during the touch driving period TP. However, since a DC-level DC voltage is applied during the display driving period DP, and a pulse-type touch driving signal is applied during the touch driving period TP, the form of the distortion of the DC voltage may be varied.

The touch display device 100 of the disclosure may distinguish between the overlap distortion due to an overlap between scan signals and a load deviation in the touch electrode in the display driving period DP and the transition distortion caused during a transition between the display driving period DP and the touch driving period TP and apply a different compensation voltage during the corresponding period, thereby addressing defects due to the DC voltage distortion and enhancing image quality.

Figure 14:
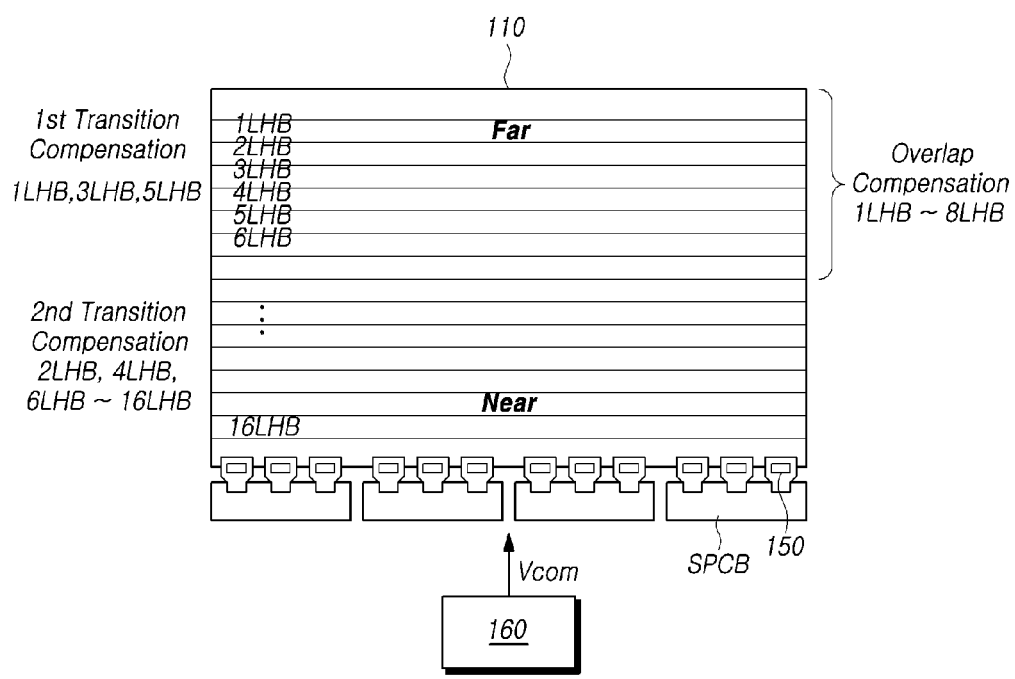
FIG. 14 is a view illustrating an example of distinguishing an overlap distortion period and a transition distortion period in a touch display device according to embodiments of the disclosure.

FIG. 14 is a view illustrating an example of distinguishing an overlap distortion period and a transition distortion period in a touch display device according to embodiments of the disclosure.

Referring to FIG. 14, the touch display device 100 according to embodiments of the disclosure may divide one display frame period into two or more display driving periods DP and two or more touch driving periods TP to perform display driving operation and touch driving operation.

In this case, each of the two or more blank periods corresponding to the two or more touch driving periods TP within one display frame period Display Frame may be referred to as a long horizontal blank (LHB). Accordingly, the touch driving period TP and the LHB may be understood as the same concept.

Thus, the touch display device 100 of the disclosure may apply different compensation voltages in the period of the overlap distortion due to an overlap between scan signals and a load deviation in the touch electrode TE in the display driving period DP and the period of the transition distortion caused during a transition between the display driving period DP and the touch driving period TP, thereby addressing defects due to the DC voltage distortion and enhancing image quality.

The overlap distortion which is a distortion of DC voltage Vcom due to the load deviation in the touch electrode TE in the display driving period DP and an overlap between scan signals SCAN may vary in size depending on the distance from the touch driving circuit 150.

For example, the power management circuit 160 may be positioned at a lower end of the display panel 110, and the DC voltage Vcom may be supplied to the display panel 110 through the source printed circuit board SPCB on which the touch driving circuit 150 is mounted. In this case, the overlap distortion which is a distortion of DC voltage Vcom due to the load deviation in the touch electrode TE in the display driving period DP and an overlap between scan signals SCAN occurs less in the lower end area of the display panel 110 corresponding to a position "near" to the touch driving circuit 150. In contrast, the overlap distortion due to the scan signal SCAN occurs more in the upper end area of the display panel 110 corresponding to a position "far" from the touch driving circuit 150.

This is contributed to an increase in the load of the touch electrode TE disposed in the position far from the touch driving circuit 150 due to formation of a larger parasitic capacitance between the gate line GL and the touch electrode TE disposed at the upper end of the display panel 110 than between the gate line GL and the touch electrode TE disposed at the lower end of the display panel 110.

Further, when the DC voltage Vcom supplied from the power management circuit 160 is supplied from the lower end to upper end of the display panel 110, the DC voltage Vcom arriving at the touch electrode TE disposed at the upper end of the display panel 110 may be reduced in level due to the resistance component of the signal line and undergo a time delay. Accordingly, the DC voltage Vcom supplied to the touch electrode TE disposed at the upper end of the display panel 110 may be further affected by the load of the touch electrode TE, so that the distortion may increase.

Accordingly, the overlap distortion period due to the overlap between scan signals SCAN and the load deviation in the touch electrode TE in the display driving period DP and the level of an overlap compensation voltage for compensating for the overlap distortion may be determined considering the positional relationship with the touch driving circuit 150 or the power management circuit 160.

For example, when one display frame period Display Frame is divided into 16 display driving periods DP1 to DP16 and 16 touch driving periods TP1 to TP16 to perform alternately display driving operation and touch driving operation, such a level of overlap compensation voltage as to be able to compensate for the overlap distortion due to the scan signal SCAN during the corresponding period between the first touch driving period TP1, 1LHB to the eight touch driving period TP8, 8LHB which proceed at the upper end of the display panel 110 may be supplied.

In contrast, the transition distortion which occurs during a transition between the display driving period DP and the touch driving period TP may vary in size depending on the number of overlaps between scan signals SCAN appearing in the transition period between the display driving period DP and the touch driving period TP.

For example, when seven gate lines GL correspond to one touch electrode TE, a larger transition distortion may occur in the display driving period DP when four scan signals SCAN overlap than in the display driving period DP when three scan signals SCAN overlap.

Further, when the touch electrodes TE have different sizes as in the woven-type, the transition distortion due to the gate line GL corresponding to the long touch electrode which is longer may be larger than the transition distortion due to the gate line GL corresponding to the short touch electrode which is shorter.

Accordingly, the level of the transition compensation voltage for compensating for the transition distortion occurring during a transition between the display driving period DP and the touch driving period TP may be determined considering the number of overlaps between scan signals SCAN in the transition distortion period or the shape of the touch electrode TE corresponding to the gate line GL where the scan signal SCAN is supplied.

For example, when one display frame period Display Frame is divided into 16 display driving periods DP1 to DP16 and 16 touch driving periods TP1 to TP16 to alternately display driving and touch driving, the first touch driving period TP1, 1LHB, the third touch driving period TP3, 3LHB, and the fifth touch driving period TP5, 5LHB when the number of overlaps between scan signals SCAN is large may be set to a first transition distortion period, and a first transition compensation voltage may be applied. Further, the second touch driving period TP2, 2LHB, the fourth touch driving period TP4, 4LHB, and the sixth touch driving period TP6, 6LHB to the 16th touch driving period TP16, 16LHB when the number of overlaps between scan signals SCAN is small may be set to a second transition distortion period, and a second transition compensation voltage may be applied.

The first transition distortion period when the number of overlaps between scan signals SCAN is large and the second transition distortion period when the number of overlaps between scan signals SCAN is small may be determined through a driving test during the manufacturing process of the display panel 110 or may be determined by reflecting the arrangement of the touch electrodes TE and the scan signal SCAN in the driving process of the display panel 110.

In this case, since the first transition compensation voltage is applied in a period when the transition distortion is large, and the second transition compensation voltage is applied to a period when the transition distortion is small, the level of the first transition compensation voltage may be set to be larger than the level of the second transition compensation voltage.

Figure 15:
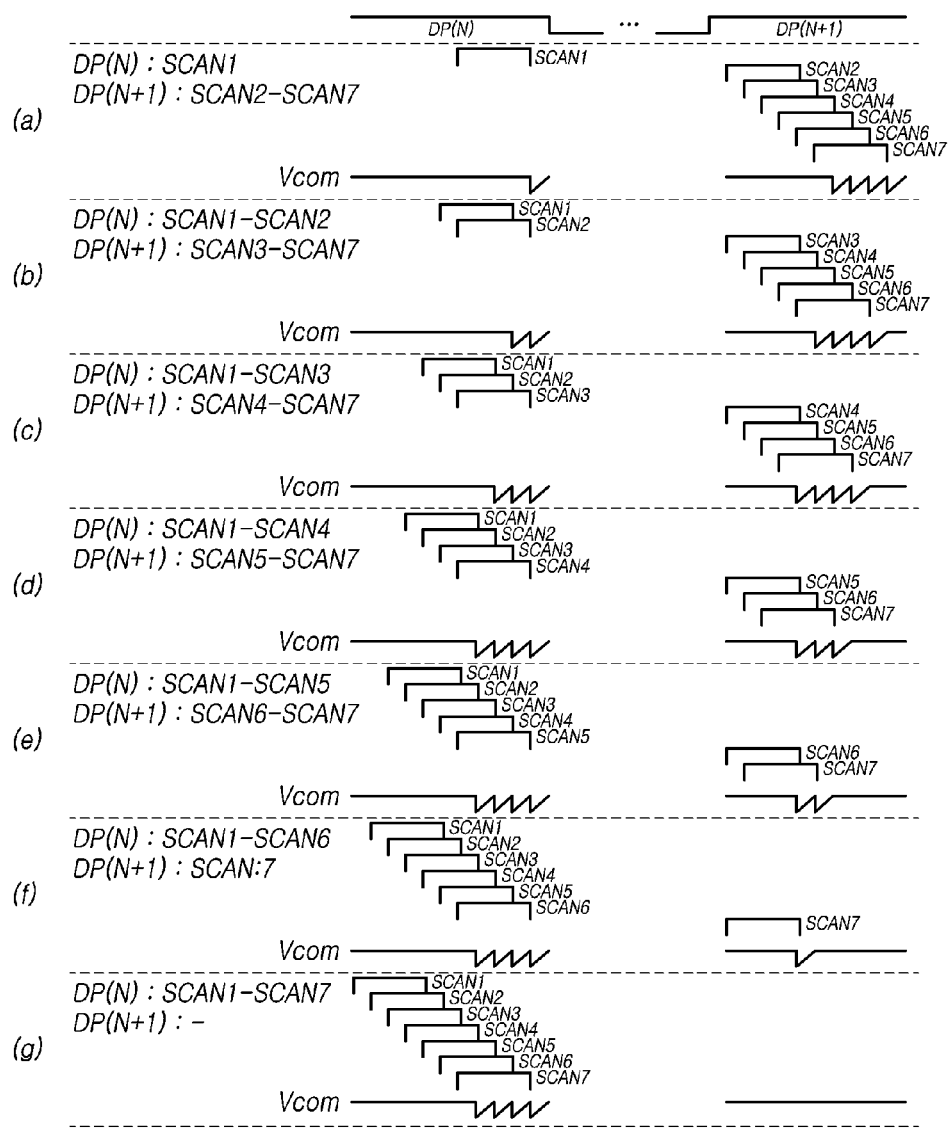
FIG. 15 is a view illustrating an example of a first transition distortion period when there are more scan signal overlaps in transition distortion and a second transition distortion period when there are less scan signal overlaps in a display device according to embodiments of the disclosure.

FIG. 15 is a view illustrating an example of a first transition distortion period when there are more scan signal overlaps in transition distortion and a second transition distortion period when there are less scan signal overlaps in a display device according to embodiments of the disclosure.

Referring to FIG. 15, in the display device 100 according to embodiments of the disclosure, the size of the transition distortion may vary depending on the number of overlaps between scan signals SCAN in the period when the display driving period DP and the touch driving period TP transition with respect to adjacent display driving periods DP(N) and DP(N+1).

For example, when seven gate lines GL1 to GL7 correspond to one touch electrode TE and scan signals are supplied through the seven gate lines GL1 to GL7, the seven scan signals SCAN1 to SCAN7 applied to the seven gate lines GL1 to GL7 may be divided and applied in the Nth display driving period DP(N) and the N+1th display driving period DP(N+1).

For example, as shown in part (a) of FIG. 15, the first scan signal SCAN1 may be applied through the first gate line GL1 in the Nth display driving period DP(N), and the second scan signal SCAN2 to the seventh scan signal SCAN7 may be applied through the second gate line GL2 to the seventh gate line GL7 during the N+1th display driving period DP(N+1).

In this case, only the first scan signal SCAN1 exists in the Nth display driving period DP(N), but in the N+1th display driving period DP(N+1), the second scan signal SCAN2 to the seventh scan signal SCAN7 may overlap each other at predetermined time intervals.

Accordingly, in the Nth display driving period DP(N), the transition distortion of the DC voltage Vcom is small, but in the N+1th display driving period DP(N+1), the transition distortion of the DC voltage Vcom is large.

Accordingly, in this case, the first transition compensation voltage having a high level may be applied during the N+1th display driving period DP(N+1), and the second transition compensation voltage having a low level may be applied in the Nth display driving period DP(N).

Further, as shown in part (b) of FIG. 15, in the Nth display driving period DP(N), the first scan signal SCAN1 and the second scan signal SCAN2 may be applied through the first gate line GL1 and the second gate line GL2, and the third scan signal SCAN3 to the seventh scan signal SCAN7 may be applied through the third gate line GL3 to the seventh gate line GL7 during the N+1th display driving period DP(N+1).

In this case, in the Nth display driving period DP(N), the first scan signal SCAN1 and the second scan signal SCAN2 may overlap each other at predetermined time intervals, and in the N+1th display driving period DP(N+1), the third scan signal SCAN3 to the seventh scan signal SCAN7 may overlap each other at predetermined time intervals.

Accordingly, in the Nth display driving period DP(N), the transition distortion of the DC voltage Vcom is small, but in the N+1th display driving period DP(N+1), the transition distortion of the DC voltage Vcom is large.

Accordingly, in this case, the first transition compensation voltage having a high level may be applied during the N+1th display driving period DP(N+1) when the number of overlaps between scan signals SCAN is large, and the second transition compensation voltage having a low level may be applied in the Nth display driving period DP(N) when the number of overlaps between scan signals SCAN is small.

Further, as shown in part (c) of FIG. 15, in the Nth display driving period DP(N), the first scan signal SCAN1 to the third scan signal SCAN3 may be applied through the first gate line GL1 to the third gate line GL3 and, in the N+1th display driving period DP(N+1), the fourth scan signal SCAN4 to the seventh scan signal SCAN7 may be applied through the fourth gate line GL4 to the seventh gate line GL7.

In this case, in the Nth display driving period DP(N), the first scan signal SCAN1 to the third scan signal SCAN3 may overlap each other at predetermined time intervals and, in the N+1th display driving period DP(N+1), the fourth scan signal SCAN4 to the seventh scan signal SCAN7 may overlap each other at predetermined time intervals.

Accordingly, in the Nth display driving period DP(N), the transition distortion of the DC voltage Vcom is small, but in the N+1th display driving period DP(N+1), the transition distortion of the DC voltage Vcom is large.

Accordingly, in this case, the first transition compensation voltage having a high level may be applied during the N+1th display driving period DP(N+1) when the number of overlaps between scan signals SCAN is large, and the second transition compensation voltage having a low level may be applied in the Nth display driving period DP(N) when the number of overlaps between scan signals SCAN is small.

Further, as shown in part (d) of FIG. 15, in the Nth display driving period DP(N), the first scan signal SCAN1 to the fourth scan signal SCAN4 may be applied through the first gate line GL1 to the fourth gate line GL4 and, in the N+1th display driving period DP(N+1), the fifth scan signal SCAN5 to the seventh scan signal SCAN7 may be applied through the fifth gate line GL5 to the seventh gate line GL7.

In this case, in the Nth display driving period DP(N), the first scan signal SCAN1 to the fourth scan signal SCAN4 may overlap each other at predetermined time intervals and, in the N+1th display driving period DP(N+1), the fifth scan signal SCAN5 to the seventh scan signal SCAN7 may overlap each other at predetermined time intervals.

Accordingly, in the Nth display driving period DP(N), the transition distortion of the DC voltage Vcom is large, but in the N+1th display driving period DP(N+1), the transition distortion of the DC voltage Vcom is small.

Accordingly, in this case, the first transition compensation voltage having a high level may be applied during the Nth display driving period DP(N) when the number of overlaps between scan signals SCAN is large, and the second transition compensation voltage having a low level may be applied in the N+1th display driving period DP(N+1) when the number of overlaps between scan signals SCAN is small.

Further, as shown in part (e) of FIG. 15, in the Nth display driving period DP(N), the first scan signal SCAN1 to the fifth scan signal SCAN5 may be applied through the first gate line GL1 to the fifth gate line GL5 and, in the N+1th display driving period DP(N+1), the sixth scan signal SCAN6 and the seventh scan signal SCAN7 may be applied through the sixth gate line GL6 and the seventh gate line GL7.

In this case, in the Nth display driving period DP(N), the first scan signal SCAN1 to the fifth scan signal SCAN5 may overlap each other at predetermined time intervals and, in the N+1th display driving period DP(N+1), the sixth scan signal SCAN6 and the seventh scan signal SCAN7 may overlap each other at predetermined time intervals.

Accordingly, in the Nth display driving period DP(N), the transition distortion of the DC voltage Vcom is large, but in the N+1th display driving period DP(N+1), the transition distortion of the DC voltage Vcom is small.

Accordingly, in this case, the first transition compensation voltage having a high level may be applied during the Nth display driving period DP(N) when the number of overlaps between scan signals SCAN is large, and the second transition compensation voltage having a low level may be applied in the N+1th display driving period DP(N+1) when the number of overlaps between scan signals SCAN is small.

Further, as shown in part (f) of FIG. 15, in the Nth display driving period DP(N), the first scan signal SCAN1 to the sixth scan signal SCAN6 may be applied through the first gate line GL1 to the sixth gate line GL6 and, in the N+1th display driving period DP(N+1), the seventh scan signal SCAN7 may be applied through the seventh gate line GL7.

In this case, in the Nth display driving period DP(N), the first scan signal SCAN1 to the sixth scan signal SCAN6 overlap each other at predetermined time intervals and, in the N+1th display driving period DP(N+1), only the seventh scan signal SCAN7 exists.

Accordingly, in the Nth display driving period DP(N), the transition distortion of the DC voltage Vcom is large, but in the N+1th display driving period DP(N+1), the transition distortion of the DC voltage Vcom is small.

Accordingly, in this case, the first transition compensation voltage having a high level may be applied during the Nth display driving period DP(N) when the number of overlaps between scan signals SCAN is large, and the second transition compensation voltage having a low level may be applied in the N+1th display driving period DP(N+1) when the number of overlaps between scan signals SCAN is small.

Further, as shown in part (g) of FIG. 15, in the Nth display driving period DP(N), the first scan signal SCAN1 to the seventh scan signals SCAN7 may be applied through the first gate line GL1 to the seventh gate line GL7 and, in the N+1th display driving period DP(N+1), no scan signal SCAN may be applied.

In this case, in the Nth display driving period DP(N), the first scan signal SCAN1 to the seventh scan signal SCAN7 may overlap at predetermined time intervals and, in the N+1th display driving period DP(N+1), no scan signal SCAN exists.

Accordingly, in the Nth display driving period DP(N), the transition distortion of the DC voltage Vcom is large, but in the N+1th display driving period DP(N+1), the transition distortion of the DC voltage Vcom is not small.

Accordingly, in this case, the first transition compensation voltage having a high level may be applied in the Nth display driving period DP(N) when the number of overlaps between scan signals SCAN is large.

In the touch display device 100 of the disclosure, the level of the transition compensation voltage for compensating for the transition distortion occurring during a transition between the display driving period DP and the touch driving period TP may be determined considering the shape of the touch electrode TE corresponding to the gate line GL where the scan signal SCAN is supplied in the transition period.

Figure 16A:
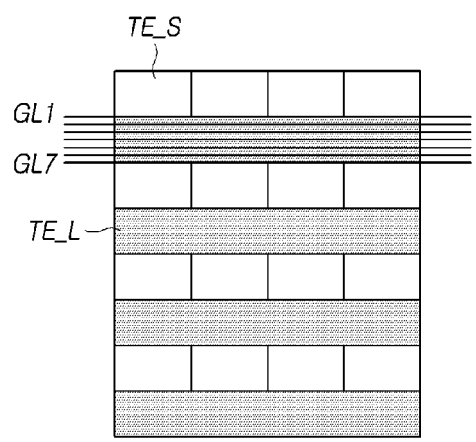
FIGS. 16A and 16B are views illustrating an example of a shape of a touch electrode corresponding to a position of a gate line in a touch display device according to embodiments of the disclosure.
Figure 16B:
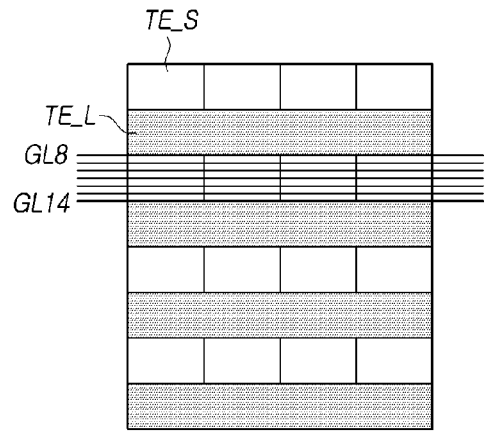

FIGS. 16A and 16B are views illustrating an example of a shape of a touch electrode corresponding to a position of a gate line in a touch display device according to embodiments of the disclosure.

Referring to FIGS. 16A and 16B, in the touch display device 100 according to embodiments of the disclosure, long touch electrodes TE_L longer in a horizontal direction and short touch electrodes TE_S shorter in the horizontal direction may be arranged in a woven-type.

As such, in a case where the sizes of the touch electrodes TE are different as shown in FIG. 16A, when the first gate line GL1 to the seventh gate line GL7 are disposed in positions corresponding to the long touch electrodes TE_L, the transition distortion due to the first scan signal SCAN1 to the seventh scan signal SCAN7 applied through the first gate line GL1 to the seventh gate line GL7 is significantly increased due to the large load formed in the long touch electrodes TE_L.

In contrast, when the eighth gate line GL8 to the fourteenth gate line GL14 are disposed in positions corresponding to the short touch electrodes TE_S as shown in FIG. 16B, the transition distortion due to the eight scan signal SCAN8 to the fourteenth scan signal SCAN14 applied through the eighth gate line GL8 to the fourteenth gate line GL14 may be relatively small due to the small load formed in the short touch electrodes TE_S.

Accordingly, to compensate for transition distortion occurring during the transition process between the display driving period DP and the touch driving period TP, the first transition compensation voltage having a high level may be applied in the period when the scan signal SCAN is applied to the gate line GL corresponding to the long touch electrode TE_L, and the second transition compensation voltage having a low level may be applied in the period when the scan signal SCAN is applied to the gate line GL corresponding to the short touch electrode TE_S.

Figure 17:
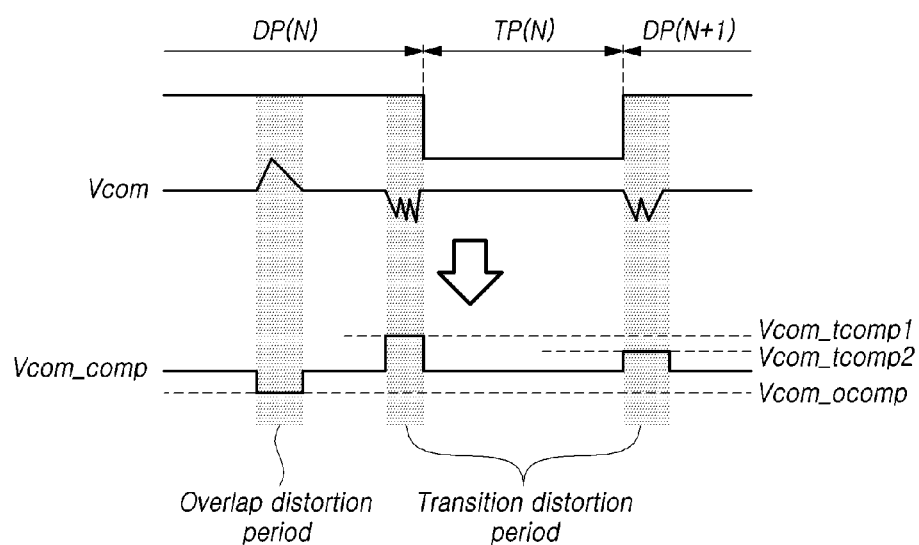
FIG. 17 is a signal waveform diagram illustrating an example of an overlap compensation voltage applied during a display driving period and a transition compensation voltage applied during a transition period in a touch display device according to embodiments of the disclosure.

FIG. 17 is a signal waveform diagram illustrating an example of an overlap compensation voltage applied during a display driving period and a transition compensation voltage applied during a transition period in a touch display device according to embodiments of the disclosure.

Referring to FIG. 17, the touch display device 100 according to embodiments of the disclosure may apply an overlap compensation voltage Vcom_ocomp capable of compensating for the overlap distortion of the DC voltage Vcom in the overlap distortion period and may apply a transition compensation voltage Vcom_tcomp1 and Vcom_tcomp2 capable of compensating for the transition distortion of the DC voltage Vcom in the transition distortion period.

In other words, the compensation voltage Vcom_comp may be divided into the overlap compensation voltage Vcom_ocomp applied in the overlap distortion period within the display driving period DP and the transition compensation voltage Vcom_tcomp1 and Vcom_tcomp2 applied in the transition distortion period when the display driving period DP and the touch driving period TP are changed.

The overlap distortion which is a distortion of DC voltage Vcom due to the load deviation in the touch electrode TE in the display driving period DP and an overlap between scan signals SCAN may vary in size depending on the distance from the touch driving circuit 150.

Further, when the DC voltage Vcom supplied from the power management circuit 160 is supplied from the lower end to upper end of the display panel 110, the DC voltage Vcom arriving at the touch electrode TE disposed at the upper end of the display panel 110 may be reduced in level due to the resistance component of the signal line and undergo a time delay. Accordingly, the DC voltage Vcom supplied to the touch electrode TE disposed at the upper end of the display panel 110 may be further affected by the load of the touch electrode TE, so that the distortion may increase.

Accordingly, the level of the overlap distortion period Vcom_ocomp applied in the overlap distortion period due to the overlap between scan signals SCAN and the load deviation in the touch electrode TE in the display driving period DP may be determined considering the positional relationship with the touch driving circuit 150 or the power management circuit 160.

Further, the transition distortion occurring during a transition between the display driving period DP and the touch driving period TP may be varied depending on the number of overlaps between scan signals SCAN applied in the transition distortion period or the shape of the touch electrode TE corresponding to the gate line GL where the scan signal SCAN is supplied.

In this case, since the transition distortion period may be divided into the first transition distortion period when the number of overlaps between scan signals SCAN is large and the second transition distortion period when the number of overlaps between scan signals SCAN is small, the first transition compensation voltage Vcom_tcomp1 may be applied in the period when the transition distortion is large, and the second transition compensation voltage Vcom_tcomp2 may be applied in the period when the transition distortion is small.

In this case, the level of the first transition compensation voltage Vcom_tcomp1 may be set to be larger than the level of the second transition compensation voltage Vcom_tcomp2.

Alternatively, it may be possible to set the pulse width of the first transition compensation voltage Vcom_tcomp1 to be larger than the pulse width of the second transition compensation voltage Vcom_tcomp2 while maintaining the first transition compensation voltage Vcom_tcomp1 and the second transition compensation voltage Vcom_tcomp2 at the same level.

The touch display device 100 of the disclosure may separately include a DC voltage compensation line capable of applying the compensation voltage Vcom_comp to the touch electrode TE to compensate for the distortion of the DC voltage Vcom.

Figure 18:
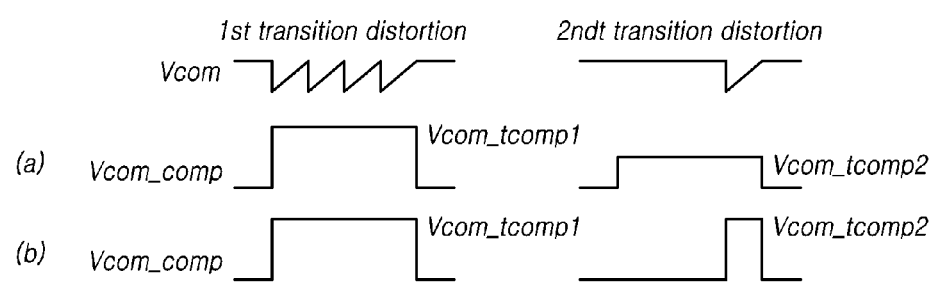
FIG. 18 is a view illustrating an example of a first transition compensation voltage and a second transition compensation voltage applied during a transition distortion period in a touch display device according to embodiments of the disclosure.

FIG. 18 is a view illustrating an example of a first transition compensation voltage and a second transition compensation voltage applied during a transition distortion period in a touch display device according to embodiments of the disclosure.

Referring to FIG. 18, the touch display device 100 according to embodiments of the disclosure may apply the first transition compensation voltage Vcom_tcomp1 or the second transition compensation voltage Vcom_tcomp2, reflecting the degree of transition distortion caused depending on the shape of the touch electrode TE or the number of overlaps between scan signals SCAN in the transition period when the display driving period DP and the touch driving period TP are changed.

Since the transition distortion period when transition distortion occurs may be divided into the first transition distortion period when the number of overlaps between scan signals SCAN is large or which corresponds to the long touch electrode TE_L and the second transition distortion period when the number of overlaps between scan signals SCAN is small or which corresponds to the short touch electrode TE_S, the first transition compensation voltage Vcom_tcomp1 may be applied in the first transition distortion period when the transition distortion is large, and the second transition compensation voltage Vcom_tcomp2 may be applied in the second transition distortion period when the transition distortion is small.

In this case, the first transition compensation voltage Vcom_tcomp1 and the second transition compensation voltage Vcom_tcomp2 may have different levels or different pulse widths.

In other words, it is possible to effectively compensate for the transition distortion by setting the level of the first transition compensation voltage Vcom_tcomp1 to be higher than the level of the second transition compensation voltage Vcom_tcomp2 as shown in part (a) of FIG. 18.

Alternatively, it may be possible to set the pulse width of the first transition compensation voltage Vcom_tcomp1 to be larger than the pulse width of the second transition compensation voltage Vcom_tcomp2 while maintaining the first transition compensation voltage Vcom_tcomp1 and the second transition compensation voltage Vcom_tcomp2 at the same level as shown in part (b) of FIG. 18.

Figure 19:
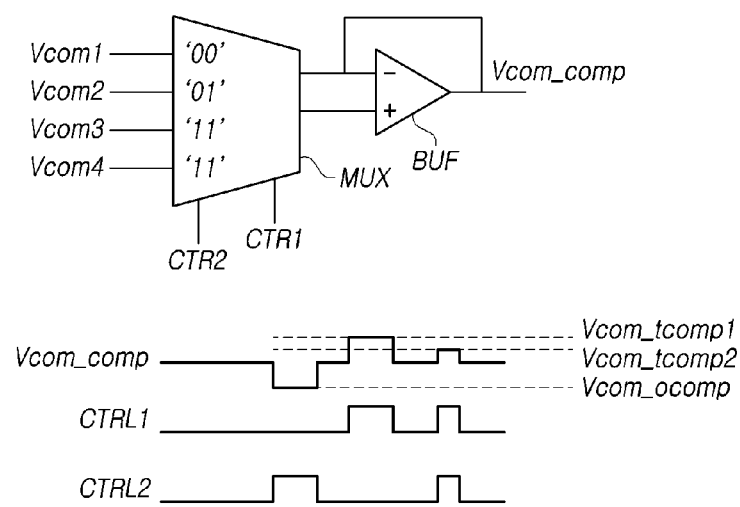
FIG. 19 is a block diagram illustrating an example of a circuit of generating a compensation voltage in a touch display device according to embodiments of the disclosure.

FIG. 19 is a block diagram illustrating an example of a circuit of generating a compensation voltage in a touch display device according to embodiments of the disclosure.

Referring to FIG. 19, in the touch display device 100 according to embodiments of the disclosure, the compensation voltage generation circuit generating the compensation voltage Vcom_comp may include a multiplexer MUX, which has a first level voltage Vcom1, a second level voltage Vcom2, a third level voltage Vcom3, and a fourth level voltage Vcom4 as inputs and whose output signal may be selected by a first control signal CTR1 and a second control signal CTR2 and a buffer circuit BUF for transferring the output signal of the multiplexer MUX.

The first level voltage Vcom1 is a voltage to be applied in a first transition distortion period when the transition distortion is large and may correspond to a voltage in a period of a higher level than the average level of the DC voltage Vcom.

The second level voltage Vcom2 is a voltage to be applied in a second transition distortion period when the transition distortion is small and may correspond to a voltage having a level higher than the average level of the DC voltage Vcom and lower than the first level voltage Vcom1.

The third level voltage Vcom3 is a voltage to be applied to the overlap distortion period and may correspond to a voltage having a level lower than the average level of the DC voltage Vcom.

The fourth level voltage Vcom4 may correspond to the average level of the DC voltage Vcom.

Accordingly, it is possible to vary the waveform of the compensation voltage Vcom_comp output from the buffer circuit BUF by controlling the waveforms of the first control signal CTR1 and the second control signal CTR2 applied to the multiplexer MUX.

In this case, the buffer circuit BUF may be omitted from the compensation voltage generation circuit.

The compensation voltage generation circuit may be positioned within the power management circuit 160 or may be positioned in the touch driving circuit 150.

Figure 20:
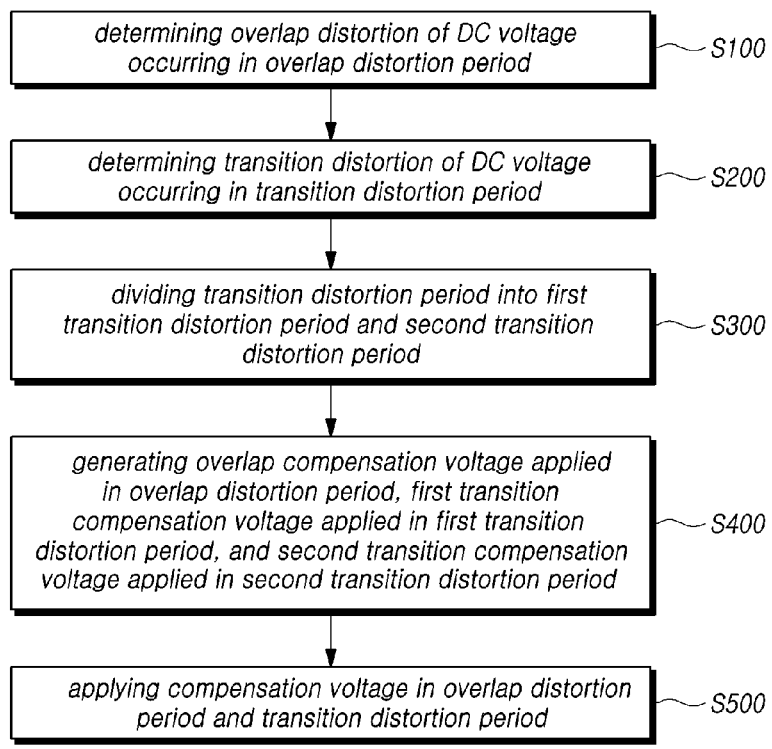
FIG. 20 is a flowchart illustrating a touch driving method according to embodiments of the disclosure.

FIG. 20 is a flowchart illustrating a touch driving method according to embodiments of the disclosure.

Referring to FIG. 20, a touch driving method according to embodiments of the disclosure may include a step S100 of determining an overlap distortion of a DC voltage Vcom caused in an overlap distortion period, a step S200 of determining a transition distortion of the DC voltage Vcom caused in a transition distortion period, a step S300 of dividing the transition distortion period into a first transition distortion period and a second transition distortion period, a step S400 of generating an overlap compensation voltage Vcom_ocomp applied in the overlap distortion period, a first transition compensation voltage Vcom_tcomp1 applied in the first transition distortion period, and a second transition compensation voltage Vcom_tcomp2 applied in the second transition distortion period, and a step S500 of applying the compensation voltage Vcom_comp in the overlap distortion period and the transition distortion period.

The step S100 of determining the overlap distortion of the DC voltage Vcom caused in the overlap distortion period is a step for determining the overlap distortion which is a distortion of the DC voltage Vcom due to an overlap between scan signals SCAN and a load deviation in the touch electrode TE in the display driving period DP. Regarding the overlap distortion, the overlap distortion period and the degree of distortion of the DC voltage Vcom may be detected in the process of manufacturing the display panel 110 and may be stored in the form of a memory, or the overlap distortion period and the degree of distortion of the DC voltage Vcom may be detected in the process of driving the display panel 110.

The step S200 of determining the transition distortion of the DC voltage Vcom caused in the transition distortion period is a step for determining the transition distortion which is a distortion of the DC voltage Vcom due to an overlap between scan signals SCAN while the gate driving circuit 120 is discontinuously operated.

The step S300 of dividing the transition distortion period into the first transition distortion period and the second transition distortion period is a step for distinguishing between the first transition distortion period when the transition distortion is large and the second transition distortion period when the transition distortion is small, considering the shape of the touch electrode TE corresponding to the gate line GL to which the scan signal SCAN is supplied and the number of overlaps between scan signals SCAN.

Regarding the first transition distortion period and the second transition distortion period, the transition distortion period and the degree of distortion of the DC voltage Vcom may be detected in the process of manufacturing the display panel 110 and may be stored in the form of a memory, or the transition distortion period and the degree of distortion of the DC voltage Vcom may be detected in the process of driving the display panel 110.

The step S400 of generating the overlap compensation voltage Vcom_ocomp applied in the overlap distortion period, the first transition compensation voltage Vcom_tcomp1 applied in the first transition distortion period, and the second transition compensation voltage Vcom_tcomp2 applied in the second transition distortion period is a step for generating the overlap compensation voltage Vcom_ocomp for compensating for the distortion of the DC voltage Vcom caused in the overlap distortion period, the first transition compensation voltage Vcom_tcomp1 for compensating for the distortion of the DC voltage Vcom caused in the first transition distortion period, and the second transition compensation voltage Vcom_tcomp2 for compensating for the distortion of the DC voltage caused in the second transition distortion period to be applied in their corresponding distortion periods.

The levels of the overlap compensation voltage Vcom_ocomp, the first transition compensation voltage Vcom_tcomp1, and the second transition compensation voltage Vcom_tcomp2 to be applied to their respective distortion periods may be stored in the memory and may be generated to be applied in their corresponding periods by the compensation voltage generation circuit.

The step S500 of applying the compensation voltage Vcom_comp in the overlap distortion period and the transition distortion period is a step for applying the generated overlap compensation voltage Vcom_ocomp, first transition compensation voltage Vcom_tcomp1, and second transition compensation voltage Vcom_tcomp2 to the touch electrode TE to correspond to their respective distortion periods.

As described above, the touch display device 100 of the disclosure may distinguish between the overlap distortion period when a distortion of the DC voltage Vcom is caused due to an overlap between scan signals SCAN and a load deviation in the touch electrode TE, and a transition distortion period when a distortion of the DC voltage Vcom occurs during a transition between the display driving period DP and the touch driving period TP and apply a different level of compensation voltage in each distortion period, thereby effectively compensating for the distortion of the DC voltage Vcom and enhancing image quality.

The foregoing embodiments are briefly described below.

According to embodiments of the disclosure, a touch display device may comprise a display panel 110 including a plurality of touch electrodes TE, a gate driving circuit 120 configured to supply a plurality of scan signals SCAN to the display panel 110 through a plurality of gate lines GL, a touch driving circuit 150 configured to detect touch sensing operation according to a change in capacitance of the plurality of touch electrodes TE, and a power management circuit 160 configured to supply different level of compensation voltages to the plurality of touch electrodes TE in each of an overlap distortion period in a display driving period DP and a transition distortion period of the display driving period DP and a touch driving period TP.

The plurality of touch electrodes TE may be split-type touch electrodes TE split in the same shape.

The plurality of touch electrodes TE may be woven-type touch electrodes including long touch electrodes longer in a first direction and short touch electrodes shorter in the first direction, the long touch electrodes and the short touch electrodes being alternately arranged in a second direction, and a plurality of short touch electrodes arranged in the second direction being connected in the same line by one touch line.

The compensation voltage Vcom_comp may include an overlap compensation voltage Vcom_ocomp supplied in the overlap distortion period, a first transition compensation voltage Vcom_tcomp1 supplied in a first transition distortion period, and a second transition compensation voltage Vcom_tcomp2 supplied in a second transition distortion period.

The overlap distortion period may be a period when a DC voltage distortion occurs due to a load deviation by the plurality of touch electrodes TE and an overlap between the plurality of scan signals SCAN.

The overlap distortion period may correspond to a touch driving period of an area far away from the power management circuit 160 or the touch driving circuit 150 in the display panel 110.

The transition distortion period may be a period when a DC voltage distortion occurs due to an overlap between the plurality of scan signals SCAN in a period when the gate driving circuit 120 is discontinuously operated.

The first transition distortion period may be a period when a number of overlaps between the plurality of scan signals SCAN is larger than a reference among a plurality of display driving periods DP, and the second transition distortion period may be a period when the number of overlaps between the plurality of scan signals SCAN is smaller than the reference among the plurality of display driving periods DP.

The first transition distortion period may be a period corresponding to a long touch electrode longer in a first direction, and the second transition distortion period may be a period corresponding to a short touch electrode shorter in the first direction.

The first transition compensation voltage Vcom_tcomp1 may have a higher level than the second transition compensation voltage Vcom_tcomp2.

The first transition compensation voltage Vcom_tcomp1 may have a larger pulse width than the second transition compensation voltage Vcom_tcomp2.

The power management circuit 160 may include a multiplexer MUX configured to receive a first level voltage corresponding to the first transition compensation voltage Vcom_tcomp1, a second level voltage corresponding to the second transition compensation voltage Vcom_tcomp2, a third level voltage corresponding to the overlap compensation voltage Vcom_ocomp, and a fourth level voltage corresponding to an average DC voltage, as inputs, and configured to select an output signal by a first control signal and a second control signal and a buffer circuit BUF transferring the output signal of the multiplexer MUX.

The first level voltage, the second level voltage, the third level voltage, and the fourth level voltage may be stored in a memory.

A touch driving circuit according to embodiments of the disclosure may comprise a touch sensing circuit configured to supply a touch driving signal through a plurality of touch lines TL to a plurality of touch electrodes TE included in a display panel 110 and receive a touch sensing signal from the plurality of touch electrodes TE, a touch controller configured to detect whether there is a touch and calculate touch coordinates according to the touch sensing signal, and a compensation voltage generation circuit configured to supply different level of compensation voltages to the plurality of touch electrodes TE in each of an overlap distortion period in a display driving period DP and a transition distortion period of the display driving period DP and a touch driving period TP.

A touch driving method according to embodiments of the disclosure, of a touch display device including a gate driving circuit 120 supplying a scan signal to a display panel 110 including a plurality of touch electrodes TE and a touch driving circuit 150 supplying a touch driving signal to the display panel 110 and sensing a touch based on a touch sensing signal received in response to the touch driving signal may comprise a step S100 of determining an overlap distortion of a DC voltage occurring in an overlap distortion period, a step S200 of determining a transition distortion of the DC voltage occurring in a transition distortion period, a step S300 of dividing the transition distortion period into a first transition distortion period and a second transition distortion period, a step S400 of generating an overlap compensation voltage Vcom_ocomp applied in the overlap distortion period, a first transition compensation voltage Vcom_tcomp1 applied in the first transition distortion period, and a second transition compensation voltage Vcom_tcomp2 applied in the second transition distortion period, and a step S500 of applying the compensation voltage in the overlap distortion period and the transition distortion period.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A touch display device comprising:
   a display panel including a plurality of touch electrodes;
   a gate driving circuit configured to supply a plurality of scan signals to the display panel through a plurality of gate lines;
   a touch driving circuit configured to detect touch according to a change in capacitance of the plurality of touch electrodes; and
   a compensation voltage generation circuit configured to supply a different level of compensation voltages to the plurality of touch electrodes in each of an overlap distortion period in a display driving period, a transition distortion period of the display driving period, and a touch driving period, wherein the compensation voltages include:
   an overlap compensation voltage supplied in the overlap distortion period;
   a first transition compensation voltage supplied in a first transition distortion period; and
   a second transition compensation voltage supplied in a second transition distortion period.

2. The touch display device of claim 1, wherein the plurality of touch electrodes are split-type touch electrodes split in a same shape.

3. The touch display device of claim 1, wherein the plurality of touch electrodes are woven-type touch electrodes including long touch electrodes and short touch electrodes, the long touch electrodes longer in a first direction than the short touch electrodes, the long touch electrodes and the short touch electrodes being alternately arranged in a second direction, and a plurality of the short touch electrodes arranged in the second direction being connected by one touch line.

4. The touch display device of claim 1, wherein the overlap distortion period is a period when a direct current (DC) voltage distortion occurs due to a load deviation between the plurality of touch electrodes and an overlap between the plurality of scan signals.

5. The touch display device of claim 4, wherein the overlap distortion period corresponds to a touch driving period of an area of the display panel that is farther away from a power management circuit or the touch driving circuit than another area of the display panel.

6. The touch display device of claim 1, wherein the transition distortion period is a period when a direct current (DC) voltage distortion occurs due to an overlap between the plurality of scan signals in a period when the gate driving circuit is discontinuously operated.

7. The touch display device of claim 6, wherein the first transition distortion period is a period when a number of overlaps between the plurality of scan signals is greater than a reference among a plurality of display driving periods, and the second transition distortion period is a period when the number of overlaps between the plurality of scan signals is less than the reference among the plurality of display driving periods.

8. The touch display device of claim 6, wherein the first transition distortion period is a period corresponding to a long touch electrode that is longer in a first direction than a short touch electrode, and the second transition distortion period is a period corresponding to the short touch electrode.

9. The touch display device of claim 1, wherein the first transition compensation voltage has a level that is greater than a level of the second transition compensation voltage.

10. The touch display device of claim 1, wherein the first transition compensation voltage has a pulse width that is greater than a pulse width of the second transition compensation voltage.

11. The touch display device of claim 1, wherein the compensation voltage generation circuit includes:
   a multiplexer configured to receive as inputs a first level voltage corresponding to the first transition compensation voltage, a second level voltage corresponding to the second transition compensation voltage, a third level voltage corresponding to the overlap compensation voltage, and a fourth level voltage corresponding to an average direct current (DC) voltage, and configured to select an output signal based on a first control signal and a second control signal; and
   a buffer circuit configured to output the output signal of the multiplexer.

12. The touch display device of claim 11, wherein the first level voltage, the second level voltage, the third level voltage, and the fourth level voltage are stored in a memory.

13. A touch driving circuit comprising:
   a touch sensing circuit configured to supply a touch driving signal through a plurality of touch lines to a plurality of touch electrodes included in a display panel, and
   receive a touch sensing signal from the plurality of touch electrodes;
   a touch controller configured to detect whether there is a touch of the display panel and calculate touch coordinates according to the touch sensing signal; and
   a compensation voltage generation circuit configured to supply a different level of compensation voltages to the plurality of touch electrodes in each of an overlap distortion period in a display driving period, a transition distortion period of the display driving period, and a touch driving period,
wherein the compensation voltages include:
   an overlap compensation voltage supplied in the overlap distortion period;
   a first transition compensation voltage supplied in a first transition distortion period; and
   a second transition compensation voltage supplied in a second transition distortion period.

14. The touch driving circuit of claim 13, wherein the first transition compensation voltage has a level that is greater than a level of the second transition compensation voltage.

15. The touch driving circuit of claim 13, wherein the first transition compensation voltage has a pulse width that is greater than a pulse width of the second transition compensation voltage.

16. The touch driving circuit of claim 13, wherein the compensation voltage generation circuit includes:
   a multiplexer configured to receive as inputs a first level voltage, a second level voltage, a third level voltage, and a fourth level voltage with different levels, and configured to select an output signal by a first control signal and a second control signal; and
   a buffer circuit configured to output the output signal of the multiplexer.

17. A touch driving method of a touch display device including a gate driving circuit supplying a scan signal to a display panel including a plurality of touch electrodes and a touch driving circuit supplying a touch driving signal to the display panel and sensing a touch based on a touch sensing signal received in response to the touch driving signal, the touch driving method comprising:
   determining an overlap distortion of a direct current (DC) voltage occurring in an overlap distortion period;
   determining a transition distortion of the DC voltage occurring in a transition distortion period;
   dividing the transition distortion period into a first transition distortion period and a second transition distortion period;
   generating an overlap compensation voltage applied in the overlap distortion period, a first transition compensation voltage applied in the first transition distortion period, and a second transition compensation voltage applied in the second transition distortion period; and
   applying the overlap compensation voltage during the overlap distortion period, and the first transition compensation voltage and the second transition compensation voltage during the transition distortion period.

* * * * *